(12) United States Patent
Bugenhagen

(10) Patent No.: US 10,601,641 B2
(45) Date of Patent: Mar. 24, 2020

(54) ACCESS CONSTRUCTS FOR CLOUD ORCHESTRATION

(71) Applicant: CenturyLink Intellectual Property LLC, Denver, CO (US)

(72) Inventor: Michael K. Bugenhagen, Overland Park, KS (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 321 days.

(21) Appl. No.: 14/919,208

(22) Filed: Oct. 21, 2015

(65) Prior Publication Data
US 2016/0226706 A1 Aug. 4, 2016

Related U.S. Application Data

(60) Provisional application No. 62/109,718, filed on Jan. 30, 2015.

(51) Int. Cl.
*H04L 12/24* (2006.01)
*H04L 12/707* (2013.01)

(52) U.S. Cl.
CPC ........ *H04L 41/0663* (2013.01); *H04L 41/082* (2013.01); *H04L 41/0806* (2013.01); *H04L 45/24* (2013.01)

(58) Field of Classification Search
CPC ............. H04L 41/0663; H04L 41/0806; H04L 41/082; H04L 45/24
See application file for complete search history.

(56) References Cited

U.S. PATENT DOCUMENTS 9,450,774 B2 * 9/2016 Ali ........................ H04L 12/64
2007/0240143 A1 * 10/2007 Guminy ................... G06F 8/70
717/168

(Continued)

FOREIGN PATENT DOCUMENTS

| EP | 2017711 A2 | 1/2008 |
|---|---|---|
| WO | WO-2017-062344 | 4/2017 |

OTHER PUBLICATIONS

International Search Report and Written Opinion prepared by the Korean Intellectual Property Office as International Searching Authority for PCT Intl Patent App. No. PCT/US2016/055293 dated Jan. 11, 2017; 12 pages.

(Continued)

*Primary Examiner* — George C Neurauter, Jr.

(57) ABSTRACT

Novel tools and techniques might provide for implementing access constructs for a network, and, in some cases, for implementing access constructs for cloud orchestration. In some embodiments, a network might provide connectivity between a first access node(s) in the network and a hardware node(s) or between two or more first access nodes, via a corresponding first link(s). An apparatus, such as one disposed at an orchestration node or the like in the network, might bridge a second access node over one or more of at least one first access node or at least one first link ("bridge node or link"), and might roll service over to the second access node from the bridged node or link. Based on a determination that failure has occurred during service through the second access node, the apparatus might roll service back over to the bridged node or link, from the second access node.

20 Claims, 17 Drawing Sheets

(56) References Cited

U.S. PATENT DOCUMENTS

| | | | |
|---|---|---|---|
| 2009/0204965 A1 | 8/2009 | Tanaka et al. | |
| 2010/0306763 A1 | 12/2010 | Lambert et al. | |
| 2012/0307684 A1 | 12/2012 | Biswas et al. | |
| 2014/0185429 A1* | 7/2014 | Takase | H04L 45/28 |
| | | | 370/225 |
| 2014/0280821 A1* | 9/2014 | Maitland | H04L 41/0668 |
| | | | 709/223 |
| 2014/0337517 A1* | 11/2014 | Naseh | H04L 41/0803 |
| | | | 709/224 |
| 2015/0143368 A1 | 5/2015 | Bugenhagen | |
| 2019/0230047 A1* | 7/2019 | McBride | H04L 47/762 |

OTHER PUBLICATIONS

International Preliminary Report on Patentability for PCT Intl Patent App. No. PCT/US2016/055293 dated Apr. 19, 2018; 9 pages.

\* cited by examiner

ACCESS CONSTRUCTS FOR CLOUD ORCHESTRATION

CROSS-REFERENCES TO RELATED APPLICATIONS

This application claims priority to U.S. Patent Application Ser. No. 62/109,718 (the "'718 Application"), filed Jan. 30, 2015 by Michael K. Bugenhagen, entitled, "Access Constructs for Cloud Orchestration," which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing access constructs in a network, and, in particular embodiments, to methods, systems, and computer software for implementing access constructs in a cloud environment.

BACKGROUND

Normal traffic migration from one system to another involves creating a duplicate protection path, and then forcing traffic from a working path to the protection path. However, when adding a new service feature that "injects" a virtual function in an existing path, there is not one signal step process for adding the function and two network segments into a protection path, and then migrating traffic. Further, typical migration of services involve immediately or soon-after tearing down the previously working path. Accordingly, when failure subsequently occurs during service through the protection path, the previously working path must be rebuilt. Regardless (i.e., even if the previously working path has not yet been torn down when failure is detected during service through the protection path), a non-trivial, multi-step process must be initiated in order to roll service back over the working path. Operationally, this process is often described as a "bridge and roll" operation, and it is conducted in order to minimize service disruptions.

Hence, there is a need for more robust and scalable solutions for implementing access constructs in a network, e.g., by implementing access constructs for cloud orchestration.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
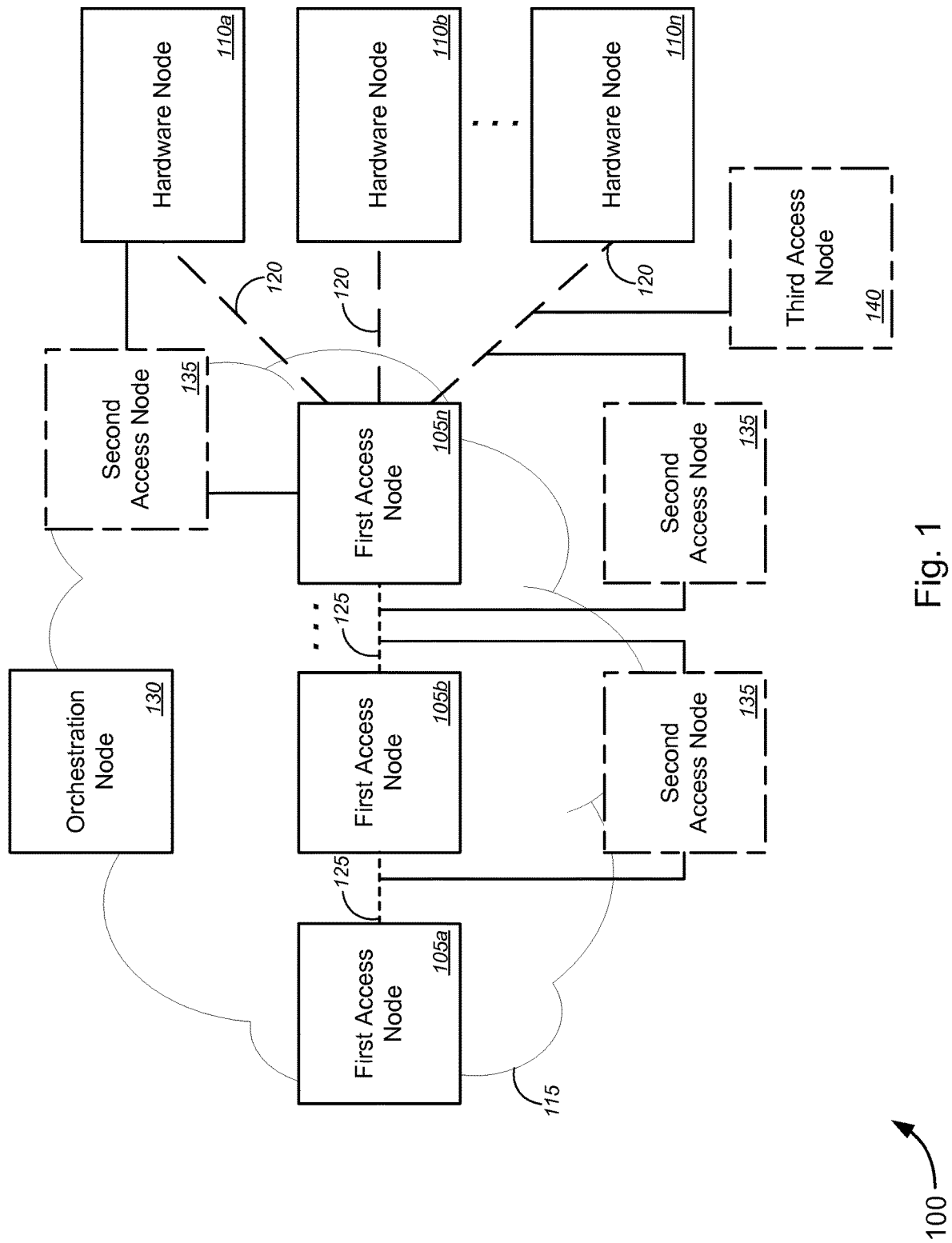
FIG. 1 is a schematic diagram illustrating a system for implementing access constructs in a network, in accordance with various embodiments.

Various embodiments provide techniques for implementing access constructs in a network, and, in some cases, for implementing access constructs for cloud orchestration.

In some embodiments, a network might provide connectivity between a first access node(s) in the network and a hardware node(s) or between two or more first access nodes, via a corresponding first link(s). An apparatus, such as one disposed at an orchestration node or the like in the network, might bridge a second access node over one or more of at least one first access node or at least one first link ("bridge node or link"), and might roll service over to the second access node from the bridged node or link. Based on a determination that failure has occurred during service through the second access node, the apparatus might roll service back over to the bridged node or link, from the second access node. Operationally, this process is referred to herein as a "modified bridge and roll" operation.

According to some embodiments, bridging the second access node over the at least one first access node and/or over the at least one first link might include, without limitation, one of the following: (a) inserting a parallel path over at least one first access node or at least one hardware node and connecting the second access node to each of first links on either side of the at least one first access node or the at least one hardware node, via the parallel path; (b) inserting a parallel path over at least one first link connecting one first access node and one hardware node or connecting two first access nodes and connecting the second access node to each of the one first access node and the one hardware node or to each of the two first access nodes, via the parallel path; (c) inserting the second access node in the at least one first link such that the at least one first link connects the second access node to each of one of the one or more first access nodes and one of the hardware nodes or to each of two first access nodes, without inserting a parallel path; and/or the like.

Merely by way of example, in some aspects, roll-back of service might be facilitated by allowing the bridged link or node to remain connected (but without service operating therethrough)—i.e., by not tearing down the link or node after rolling service over to the second access node, for at least the significant period of time (e.g., days, weeks, months, etc.), and not merely for a small amount of time after rolling over to the second access node (e.g., seconds, minutes, hours, etc.). During this significant period of time, on either a periodic, a scheduled, and/or a random basis, it may be determined whether a failure has occurred during service through the second access node.

Some examples of implementation of the various embodiments might include, but are not limited to, implementing one or more of a firewall, a virtual machine ("VM"), at least one virtual network function ("VNF"), security detection, and/or the like through the second access node that is bridged over the bridged node or link. Meanwhile, the system is configured to allow for an easy, one-step process for roll-back of service in the event that failure is detected during service involving the one or more of the firewall, the VM, the at least one VNF, the security detection, and/or the like. Such implementation allows for uninterrupted service during roll-over and roll-back of service through and from the second access node, respectively.

The following detailed description illustrates a few exemplary embodiments in further detail to enable one of skill in the art to practice such embodiments. The described examples are provided for illustrative purposes and are not intended to limit the scope of the invention. For the purposes of this disclosure, it should be recognized that a node could be "virtual" or supported on a hypervisor or Host system, or could be a physical node or network device within a network. In most cases, the figures illustrate bridging a virtual path and possibly a node (virtual machine) across the path or between two physical nodes. However, it should be understood that the "swapping" of paths via orchestration can occur in any combination of physical and/or virtual nodes, physical and/or virtual links, or the like.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network communications technology, network virtualization technology, network configuration technology, application access technology, remote application access technology, network service implementation technology, and/or the like. In other aspects, certain embodiments, can improve the functioning of a computer or network system itself (e.g., computing devices or systems that form parts of the network, computing devices or systems for performing the functionalities described below, etc.), for example, by enabling implementation of roll-over and roll-back of service through nodes (either hardware/physical or virtual) that allows for uninterrupted service, and/or the like. In particular, to the extent any abstract concepts are present in the various embodiments, those concepts can be implemented as described herein by devices, software, systems, and methods that involve specific novel functionality (e.g., steps or operations), such as implementing roll-over and roll-back (collectively, "modified bridge and roll") of service through nodes (either hardware or virtual) that allows for uninterrupted service, enabling upgrading of services, while maintaining flexibility and quick switching and switch-back of services (e.g., roll-over or roll-back), and/or the like, to name a few examples, that extend beyond mere conventional computer processing operations. These functionalities can produce tangible results outside of the implementing computer system, including, merely by way of example, ability to execute the service implementation/upgrading through the network (via added nodes (which in some cases are VM nodes or nodes hosting VNFs, etc.)), while allowing for quick roll-over and roll-back, thus enabling uninterrupted service regardless of roll-over or roll-back, and/or the like, any of which may be observed or measured by customers and/or service providers.

In an aspect, a method might comprise providing, with a network, connectivity between one or more first access nodes in the network and one or more hardware nodes or between two or more first access nodes, via corresponding one or more first links. The method might also comprise bridging a second access node over one or more of at least one first access node of the one or more first access nodes or at least one first link of the one or more first links. The method might further comprise rolling service over to the second access node that is bridging the one or more of the at least one first access node or the at least one first link.

In some embodiments, the one or more first access nodes each might comprise at least one of a node hosting an IPv4 router, a node hosting an IPv6 router, a node hosting transmission functions, a node hosting Ethernet link functions, or a node hosting one or more virtual network functions ("VNFs"), and/or the like. In some cases, the one or more hardware nodes might each comprise at least one of a wireless access point, a WiFi access point, one or more physical ports, one or more USB ports, or one or more codec devices, and/or the like. In some instances, the second access node might comprise at least one of a node hosting a virtual machine, a firewall node, a node hosting one or more VNFs, a node configured to implement security detection, and/or the like.

According to some embodiments, bridging the second access node over the one or more of the at least one first access node or the at least one first link might comprise inserting a parallel path over the at least one first access node and connecting the second access node to each of first links on either side of the at least one first access node via the parallel path. In such embodiments, rolling service over to the second access node might comprise starting service through the second access node and stopping service through the at least one first access node. In some instances, the method might further comprise determining whether a failure has occurred during service through the second access node, the failure comprising at least one of an error during operation of the service, reduced performance compared with performance through the at least one first access node, or reduced performance compared with expected performance through the second access node, and/or the like. The method might also comprise, based at least in part on a determination that a failure has occurred during service through the second access node, rolling back service over to the at least one first access node, by restarting service through the at least one first access node and stopping service through the second access node.

In alternative embodiments, bridging the second access node over the one or more of the at least one first access node or the at least one first link might comprise inserting the second access node in the at least one first link such that the at least one first link connects the second access node to each of one of the one or more first access nodes and one of the hardware nodes (without inserting a parallel path).

In yet other alternative embodiments, bridging the second access node over the one or more of the at least one first access node or the at least one first link might comprise inserting a parallel path over the at least one first link connecting one first access node and one hardware node, and connecting the second access node to each of the one first access node and the one hardware node via the parallel path. In such embodiments, rolling service over to the second access node might comprise starting service through the second access node and stopping service through the at least one first link. In some cases, the method might further comprise determining whether a failure has occurred during service through the second access node, the failure comprising at least one of an error during operation of the service or reduced performance compared with expected performance through the second access node, and/or the like. In some cases, the method might also comprise, based at least in part on a determination that a failure has occurred during service through the second access node, rolling back service over to the at least one first link, by restarting service through the at least one first link and stopping service through the second access node.

In some instances, the method might further comprise testing service through the second access node, prior to rolling service over to the second access node. In other cases, the method might further comprise connecting, with the network, a third access node to one first link of the one or more first links in a branching configuration from the one first link, without bridging any of the one or more first links or any of the one or more first access nodes.

In another aspect, a system might comprise a network that provides connectivity between one or more first access nodes in the network and one or more hardware nodes or between two or more first access nodes, via corresponding one or more first links. The system might further comprise an orchestration node in the network, the orchestration node comprising one or more processors and a computer readable medium in communication with the one or more processors. The computer readable medium might have encoded thereon computer software comprising a set of instructions that, when executed by the one or more processors, causes the orchestration node to perform one or more operations. The set of instructions might comprise instructions for bridging a second access node over one or more of at least one first access node of the one or more first access nodes or at least one first link of the one or more first links and instructions for rolling service over to the second access node that is bridging the one or more of the at least one first access node or the at least one first link.

In some embodiments, the instructions for bridging the second access node over the one or more of the at least one first access node or the at least one first link might comprise instructions for inserting a parallel path over the at least one first access node and connecting the second access node to each of first links on either side of the at least one first access node via the parallel path. In such embodiments, the instructions for rolling service over to the second access node might comprise instructions for starting service through the second access node and instructions for stopping service through the at least one first access node. In some cases, the set of instructions might further comprise instructions for determining whether a failure has occurred during service through the second access node, the failure comprising at least one of an error during operation of the service, reduced performance compared with performance through the at least one first access node, or reduced performance compared with expected performance through the second access node, and/or the like. The set of instructions might also comprise instructions for, based on a determination that a failure has occurred during service through the second access node, rolling back service over to the at least one first access node, by restarting service through the at least one first access node and stopping service through the second access node.

In alternative embodiments, the instructions for bridging the second access node over the one or more of the at least one first access node or the at least one first link might comprise instructions for inserting the second access node in the at least one first link such that the at least one first link connects the second access node to each of one of the one or more first access nodes and one of the hardware nodes (without inserting a parallel path).

In yet other alternative embodiments, the instructions for bridging the second access node over the one or more of the at least one first access node or the at least one first link comprise instructions for inserting a parallel path over the at least one first link connecting one first access node and one hardware node, and connecting the second access node to the one first access node and the one hardware node via the parallel path. In such embodiments, the instructions for rolling service over to the second access node might comprise instructions for starting service through the second access node and instructions for stopping service through the at least one first link. In some instances, the set of instructions might further comprise instructions for determining whether a failure has occurred during service through the second access node, the failure comprising at least one of an error during operation of the service or reduced performance compared with expected performance through the second access node, and/or the like. The set of instructions might also comprise instructions for, based on a determination that a failure has occurred during service through the second access node, rolling back service over to the at least one first link, by restarting service through the at least one first link and stopping service through the second access node.

In yet another aspect, an apparatus might be provided at an orchestration node in a network that provides connectivity between one or more first access nodes in the network and one or more hardware nodes or between two or more first access nodes, via corresponding one or more first links. The apparatus might comprise a non-transitory computer readable medium having encoded thereon a set of instructions executable by one or more computers to cause the apparatus to perform one or more operations. The set of instructions might comprise instructions for bridging a second access node over one or more of at least one first access node of the one or more first access nodes or at least one first link of the one or more first links and instructions for rolling service over to the second access node that is bridging the one or more of the at least one first access node or the at least one first link.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

Figure 6:
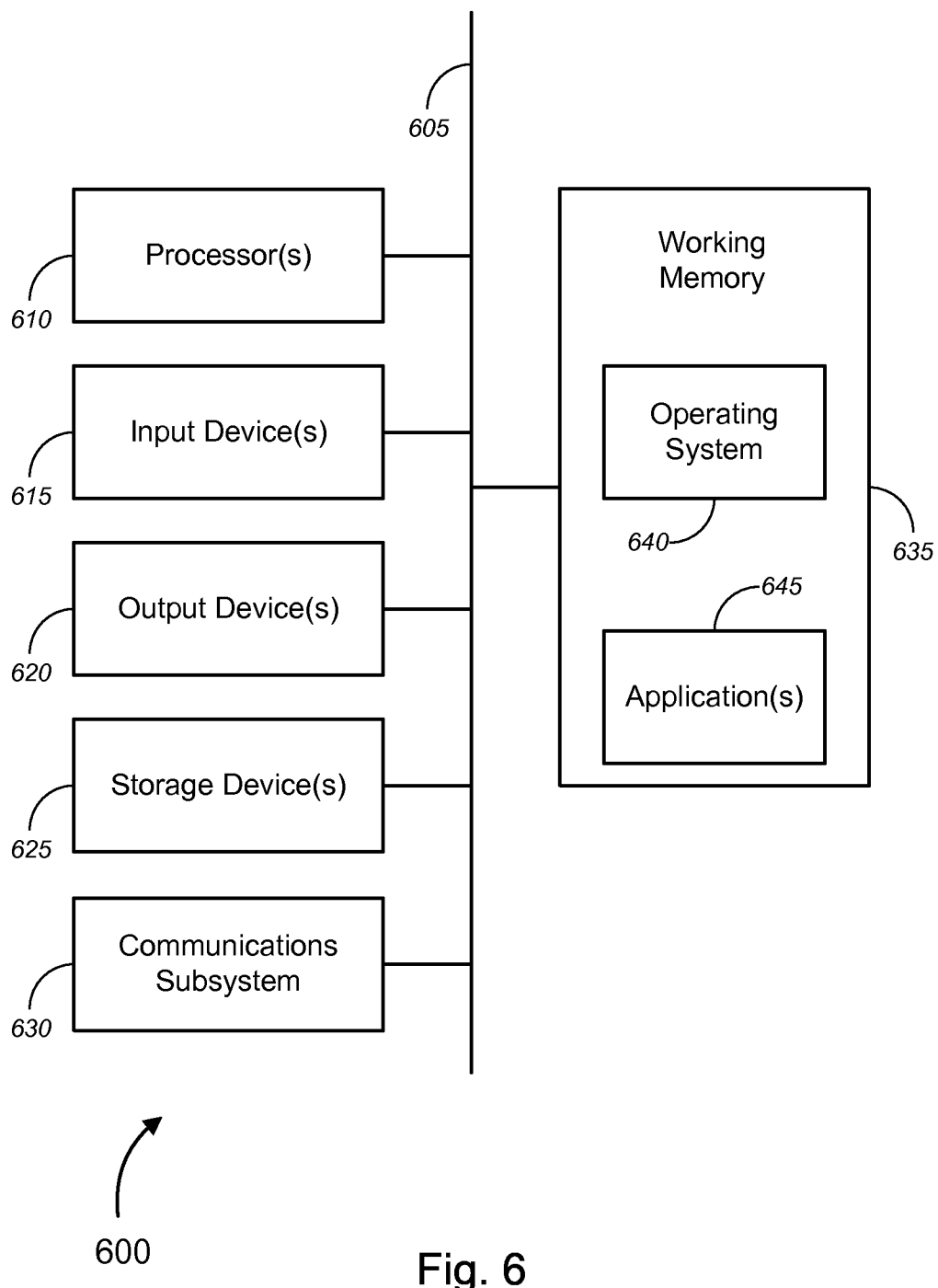
FIG. 6 is a block diagram illustrating an exemplary computer or system hardware architecture, in accordance with various embodiments.
Figure 7:
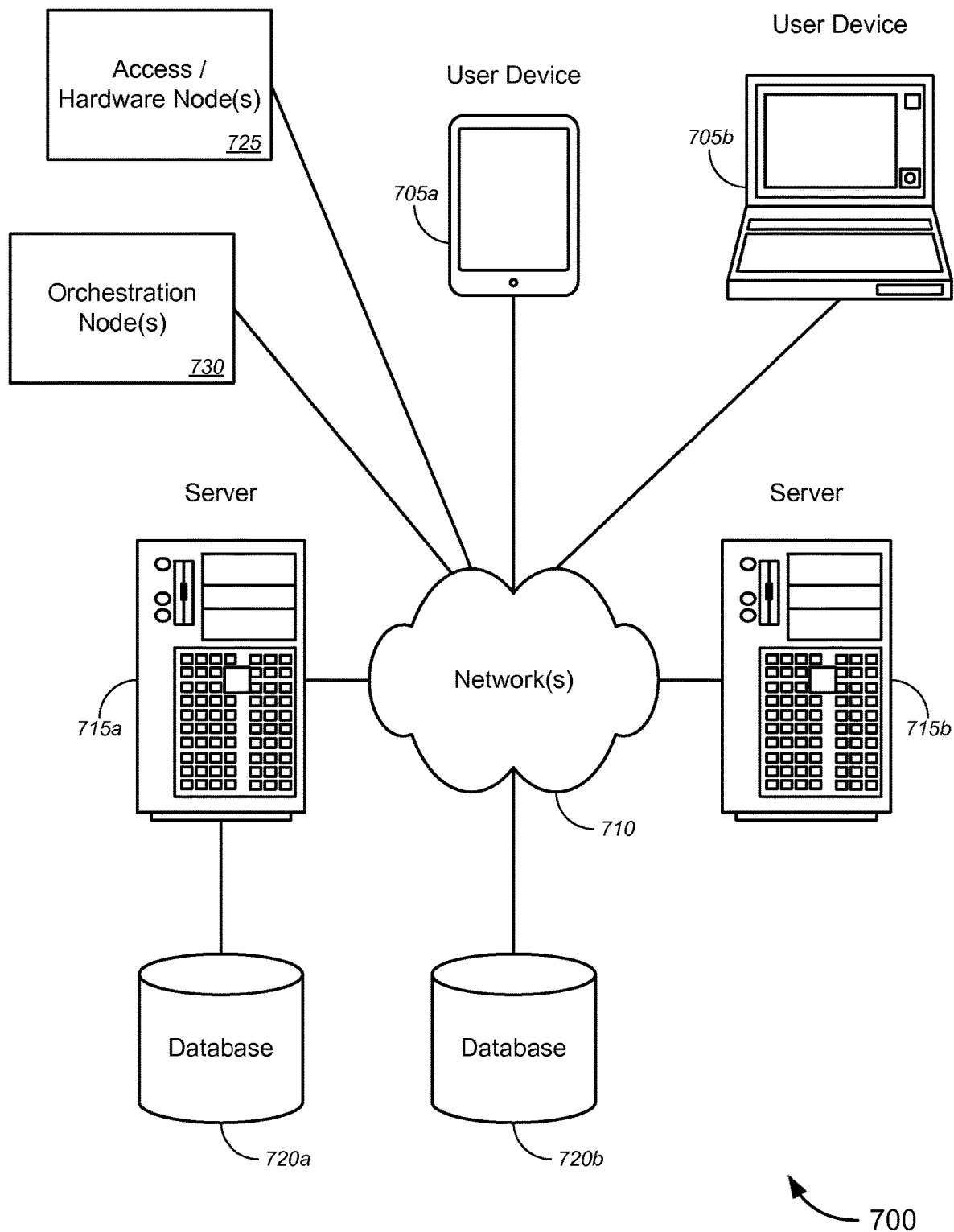
FIG. 7 is a block diagram illustrating a networked system of computers, computing systems, or system hardware architecture, which can be used in accordance with various embodiments.

We now turn to the embodiments as illustrated by the drawings. FIGS. 1-7 illustrate some of the features of the method, system, and apparatus for implementing access constructs in a network (e.g., cloud environment), as referred to above. FIGS. 1-5 illustrate some of the specific (although non-limiting) exemplary features of the method, system, and apparatus for implementing access constructs in a network (e.g., cloud environment), while FIGS. 6 and 7 illustrate exemplary system and hardware implementation. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing access constructs in a network, in accordance with various embodiments. In the embodiment of FIG. 1, system 100 might comprise one or more first access nodes 105a-105n (collectively, "first access nodes 105"), one or more hardware nodes 110a-110n (collectively, "hardware nodes 110"), and network 115. In some embodiments, the one or more first access nodes 105 might each include, without limitation, at least one of a node hosting an IPv4 router, a node hosting an IPv6 router, a node hosting transmission functions, a node hosting Ethernet link functions, or a node hosting one or more virtual network functions ("VNFs"), and/or the like. According to some embodiments, the one or more hardware nodes 110 might each include, but are not limited to, at least one of a wireless access point, a WiFi access point, one or more physical ports, one or more universal serial bus ("USB") ports, or one or more codec devices, and/or the like.

In some embodiments, the network 115 can include, but is not limited to, a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet. According to some embodiments, the network might include a software defined network ("SDN"), or the like.

The system 100, as shown in the non-limiting embodiment of FIG. 1, might further include, without limitation, one or more links 120 each communicatively coupling a first access node 105 with a hardware node 110 and one or more links 125 each communicatively coupling two first access nodes 105 (with links 120 and 125 collectively being referred to as "one or more links," "one or more first links," or "one or more network links"). The system 100, in some embodiments, might further comprise an orchestration node 130, which might be configured to provide connectivity between one or more first access nodes 105 in the network 115 and one or more hardware nodes 110 via the one or more links 120, or between two or more first access nodes 105 via one or more links 125. In some embodiments, the orchestration node 130 might include, without limitation, at least one of a domain orchestrator, a domain controller, a global service controller, and/or the like.

In some embodiments, the orchestration node 130 (or other network elements) might bridge a second access node 135 (or cause the second access node 135 to be bridged) over at least one first access node 105 of the one or more first access nodes 105, over at least one first link of the one or more first links (i.e., over at least one link 120 or over at least one link 125, etc.), and/or a combination of these network components. According to some embodiments, the second access node 135 might include, without limitation, at least one of a node hosting a virtual machine, a firewall node, a node hosting one or more VNFs, a node configured to implement security detection (including, but not limited to, an intrusion detection system ("IDS") client, or the like), and/or the like. In general, orchestration enables automated change of service configuration or automated change of service chain. The "modified bridge and roll" or "roll-over and roll-back" function (as described herein) is used to replace paths and/or insert new service node features, including, but not limited to, adding a fire wall to a path, simply migrating traffic from one node to another, migrating traffic from one path to another. In some cases, the node or path from which the traffic is migrated is removed from service permanently, or temporarily so as to upgrade its software. These service changes can occur at any point along a service chain or service path at each link and/or node. Once in service, the only way to minimize disruption is to construct the new service leg, possibly with a new node in the path of the new leg, then activate the new links, and subsequently de-activate the old links in order to "migrate" the service to the new service path, while providing functionality (as described herein) to detect failures in the new leg and to allow for facilitated or quick "roll-back" of service back through the original node or path over the old links or old leg, in response to detection or discover of issues or failures in the new leg.

Merely by way of example, in some aspects, bridging the second access node 135 over the at least one first access node 105 and/or over the at least one first link might include, but is not limited to one of the following: (a) inserting a parallel path over at least one first access node and connecting the second access node to each of first links on either side of the at least one first access node 105, via the parallel path (as shown, e.g., in the non-limiting embodiment of FIG. 2D); (b) inserting a parallel path over at least one first link connecting one first access node 105 and one hardware node 110, and connecting the second access node 135 to each of the one first access node 105 and the one hardware node 110, via the parallel path (as shown, e.g., in the non-limiting embodiment of FIG. 2C); (c) inserting the second access node 135 in the at least one first link such that the at least one first link connects the second access node 135 to each of one of the one or more first access nodes 105 and one of the hardware nodes 110, without inserting a parallel path (as shown, e.g., in the non-limiting embodiment of FIG. 2A); and/or the like.

FIG. 1 shows various different embodiments of bridging of the second access node, including those listed in (a)-(c) above. In a particular embodiment, FIG. 1 shows one of the second access nodes 135 bridging link 120 and communicatively coupling the second access node 135 to each of first access node 105n and hardware node 110a. In an alternative or additional embodiment, FIG. 1 also shows one of the second access nodes 135 bridging first access node 105n and communicatively coupling the second access node 135 to each of link 125 (coupling first access nodes 105b and 105n) and link 120 (coupling first access node 105n and hardware node 110n). In yet another alternative or additional embodiment, FIG. 1 further shows one of the second access nodes 135 bridging first access node 105b and communicatively coupling the second access node 135 to each of link 125 (coupling first access nodes 105a and 105b) and link 125 (coupling first access nodes 105b and 105n). As can be appreciated by a person skilled in the art, in view of these examples, the second access node 135 may bridge any one or more of the first access nodes 105a-105n, any one of the links 120, any one of the links 125, any of the hardware nodes 110, and/or the like, and the second access node 135, while bridging any one or more of these network components, may be communicatively coupled to each of two or more first access nodes 105, two or more hardware nodes 110, a first access node 105 and a hardware node 110, two links 125, a link 120 and a link 125, a link 120 and another link on the other side of a hardware node 110 that is connected with hardware (not shown), and/or the like.

Figure 2A:
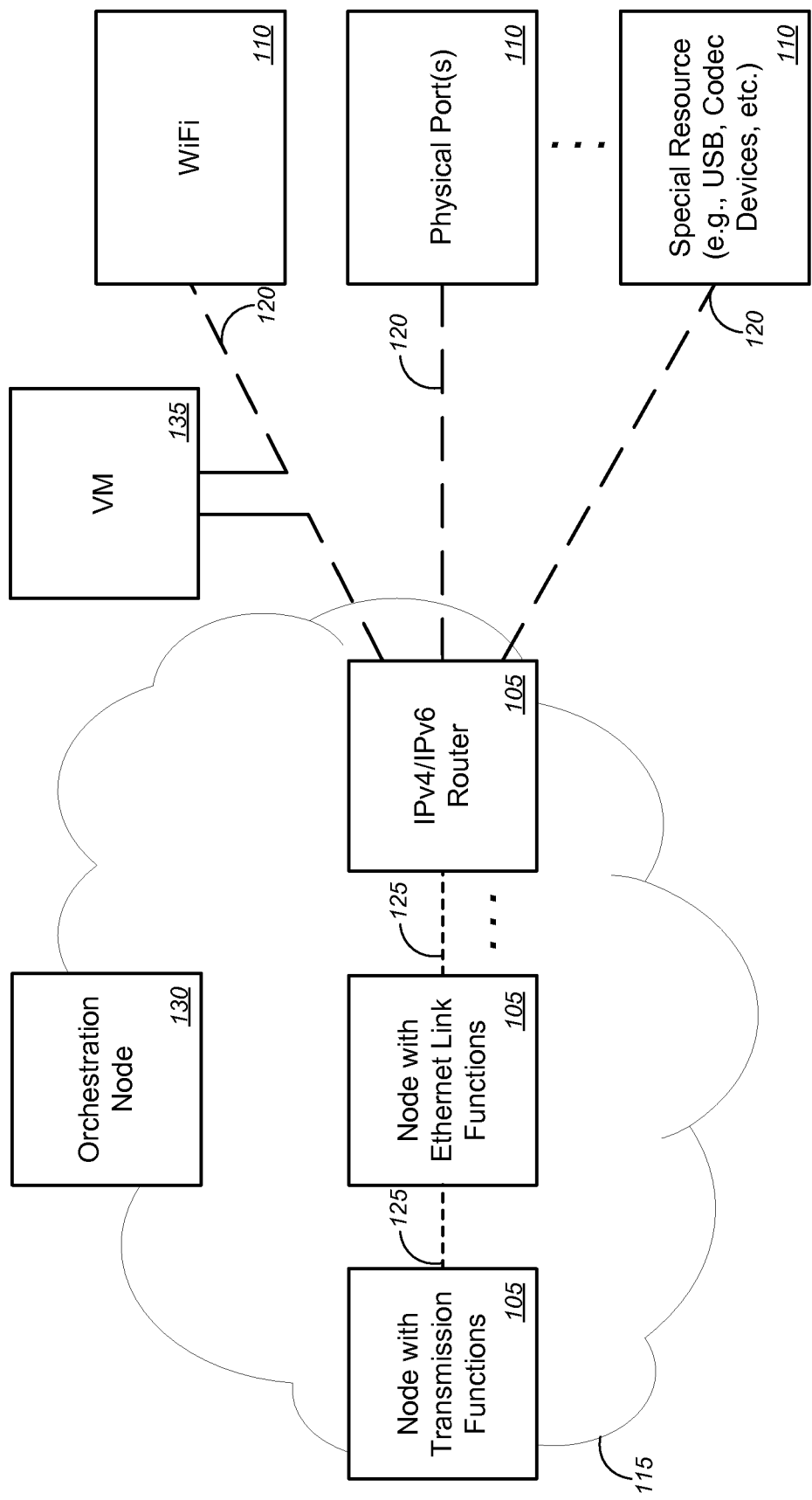
FIGS. 2A-2D are schematic diagrams illustrating various embodiments of a system for implementing access constructs in a network.
Figure 2B:
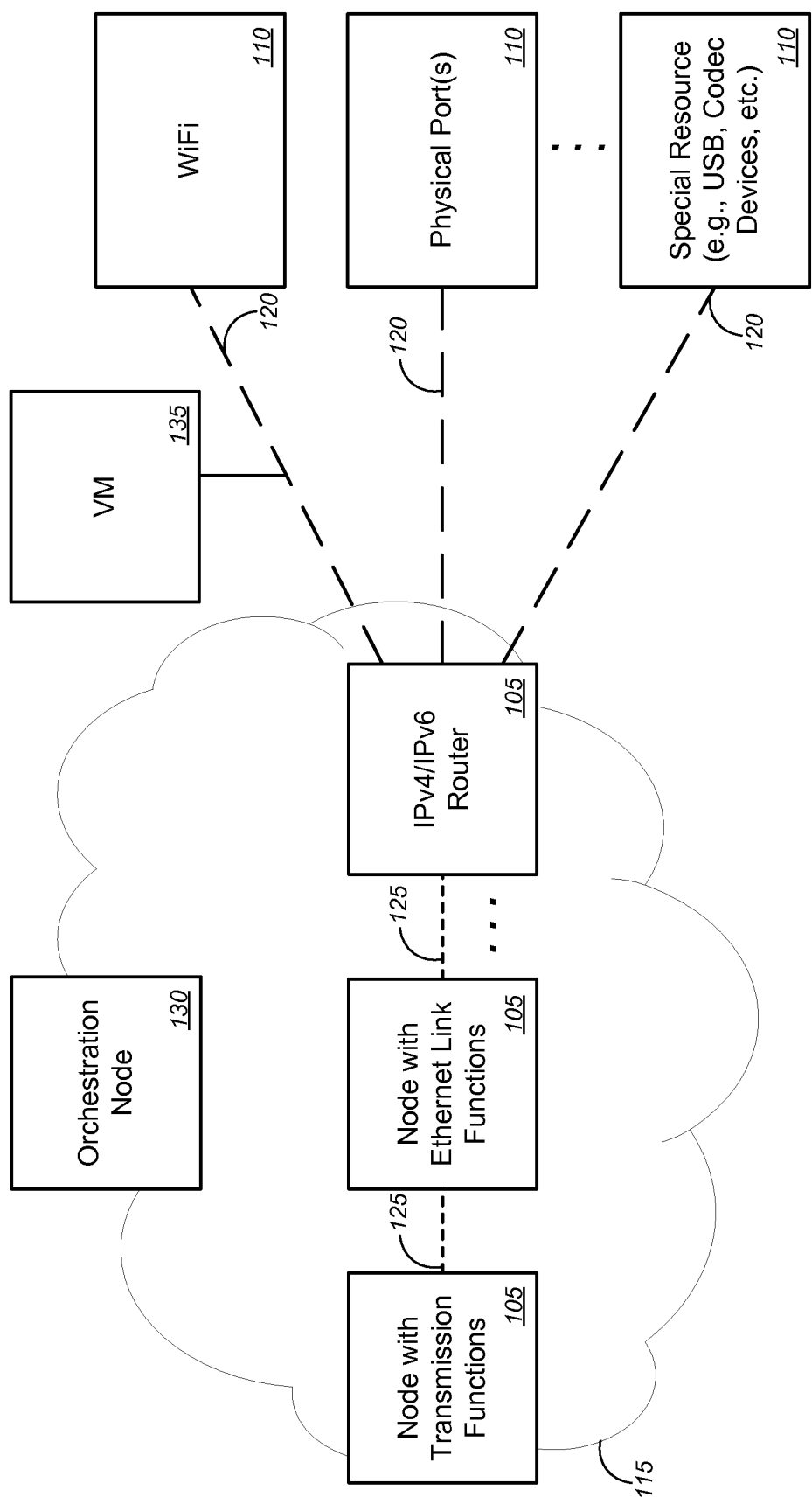

According to some embodiments, the orchestration node 130 (or other network elements) might communicatively couple a third access node 140 to one of the links 120, to one of the links 125, and/or the like, in a branching configuration from said link without bridging any first links 120 or 125, any access nodes 105, or any hardware nodes 110 (see also the embodiment as shown in, e.g., FIG. 2B).

In operation, after the second access node 135 has been bridged over the at least one first access node 105 and/or over the at least one first link, the orchestration node 130 (or other network elements) might roll service from service through the at least one first access node 105 and/or through the at least one first link, over to the second access node 135. Herein, "rolling service over to the second access node" might refer to starting service through the second access node and stopping service through the one or more of the at least one first access node and/or the at least one first link over which the second access node is bridged.

In some (optional) embodiments, prior to rolling service over to the second access node 105, the orchestration node 130 (or other network elements) might test service through the second access node 135, in order to determine whether service through the second access node 135 can be delivered within expected thresholds of operation, can be delivered within operational ranges in view of existing service over the at least one first access node 105 and/or over the at least one first link over which the second access node 135 is intended to be bridged or has been bridged, can be operated as intended, and/or the like. In some instances, testing the path may be conducted using "orchestration clients," including, for example, an Open Stack Nova Client or the like, to send operations, administration, and maintenance ("OAM") test frames across the new path to validate the path as being available before migrating traffic to it. Alternatively, testing the path may be performed at the "host" or virtual machine levels via their clients and/or protocols that provide connectivity visibility. In general, this is a "look before you leap" type of path check that is used to ensure the orchestrator does not roll traffic to a failed path.

Merely by way of example, in some aspects, after the service has been rolled over to the second access node 105 and from the bridged at least one first access node 105 and/or at least one first link, the orchestration node 130 (or other network elements) might, on a periodic, scheduled, and/or random basis, determine whether a failure has occurred during service through the second access node 105. According to some embodiments, a failure might include, without limitation, at least one of an error during operation of the service, reduced performance compared with performance through the at least one first access node, reduced performance compared with expected performance through the second access node, and/or the like. Failure detection can be, and often is, provided by "host clients" in a cloud environment that monitors for traffic or the lack thereof, monitors connectivity to other nodes, and/or the like. Based at least in part on a determination that a failure has occurred during service through the second access node, the orchestration node 130 (or other network elements) might roll service from the second access node 105, back over to the at least one first access node or the at least one first link. This might occur despite the roll over to the second access node 135 having been implemented some significant time beforehand (e.g., days, weeks, months, etc.), and not merely a small amount of time after rolling over to the second access node 135 (e.g., seconds, minutes, hours, etc.). In some embodiments, such roll-back might be facilitated by allowing the bridged at least one first access node 105 and/or at least one first link to remain connected (but without service operating therethrough)—i.e., by not tearing down the at least one first access node 105 and/or at least one first link after rolling service over to the second access node 135, for at least the significant time period indicated above.

FIGS. 2A-2D (collectively, "FIG. 2") are schematic diagrams illustrating various embodiments 200 of a system for implementing access constructs in a network. FIGS. 3A-3D (collectively, "FIG. 3") are schematic diagrams illustrating system configurations 300 for a method of implementing a bridge-and-roll access construct across a network link for network or cloud orchestration, in accordance with various embodiments. FIGS. 4A-4D (collectively, "FIG. 4") are schematic diagrams illustrating system configurations 400 for a method of implementing a bridge-and-roll access construct across a network access node for network or cloud orchestration, in accordance with various embodiments. FIGS. 2-4 depict one particular set of embodiments, in which one or more of the first access nodes 105 is embodied as a node with transmission, one or more of the first access nodes 105 is embodied as a node with Ethernet link functions, one or more of the first access nodes 105 is embodied as a node hosting an IPv4 router or as a node hosting an IPv6 router, and/or the like. Although not specifically shown, one or more of the first access nodes 105 might be embodied as a node hosting one or more virtual network functions ("VNFs"). In some cases, VNFs might provide one or more of the transmission functions, the Ethernet link functions, the IPv4 router functions, the IPv6 router functions, and/or the like.

Also as depicted in the particular set of embodiments of FIGS. 2-4, one or more hardware nodes 110 might be embodied as a WiFi access point, one or more hardware nodes 110 might be embodied as at least one physical port, one or more hardware nodes 110 might be embodied as a special resource device (e.g., as at least one USB port, at least one codec device, and/or the like), and/or the like. Although not specifically shown, one or more hardware nodes might be embodied as a wireless access point (that is a non-WiFi based access point). In FIGS. 2-4, the second access point 135 is shown as being embodied by a node hosting a virtual machine ("VM"). The various embodiments, however, are not so limited, and the second access point 135 may be embodied by at least one of the node hosting a VM, a firewall node, a node hosting one or more VNFs, a node configured to implement security detection, and/or the like.

The embodiments of FIGS. 2-4 are otherwise similar, or identical, to the embodiments of FIG. 1, and the description of the various embodiments of system 100 and operation of system 100 of FIG. 1 are similarly applicable to corresponding or similar components of systems 200, 300, and 400.

With reference to FIG. 2, FIG. 2A depicts an embodiment [herein also referred to as "Link Insertion"] in which a node 135 hosting a VM (also referred to as a "VM node") is inserted in link 120 such that the link 120 connects the VM node 135 to each of an access node 105 having IPv4 or IPv6 router functionality and a hardware node 110 having WiFi access point functionality. FIG. 2B depicts an embodiment [herein also referred to as "Simple Join"] in which a VM node 135 is communicatively coupled to link 120 in a branching configuration from link 120 without bridging any links 120 or 125, any access nodes 105, or any hardware nodes 110. FIG. 2C depicts an embodiment [herein also referred to as "Link Bridge for Roll"] in which a VM node 135 is inserted in a parallel path (i.e., bridged) over link 120 connecting an access node 105 having IPv4 or IPv6 router functionality and a hardware node 110 having WiFi access point functionality. FIG. 2D depicts an embodiment [herein also referred to as "Node Bridge for Roll"] in which a VM node 135 is inserted in a parallel path over an access node 105 having IPv4 or IPv6 router functionality and connecting the VM node 135 to each of link 125 (connecting the access node 105 having IPv4 or IPv6 router functionality and an access node 105 having Ethernet link functionality) and link 120 (connecting the access node 105 having IPv4 or IPv6 router functionality and a hardware node 110 having WiFi access point functionality), via the parallel path.

Although FIG. 2 depicts particular configurations for each of the Link Insertion (FIG. 2A), Simple Join (FIG. 2B), Link Bridge for Roll (FIG. 2C), and Node Bridge for Roll (FIG. 2D), the various embodiments are not so limited, and the VM node 135 may be link-inserted in any of links 120 or links 125 for the Link Insertion, the VM node 135 may be joined to any of links 120 or links 125 for Simple Join, the VM node 135 may be bridged over any of links 120 or links 125 for Link Bridge for Roll, and the VM node 135 may be bridged over any of nodes 105 or 110 for Node Bridge for Roll, and/or the like. Also, as described above, for each of the Link Insertion (FIG. 2A), Simple Join (FIG. 2B), Link Bridge for Roll (FIG. 2C), and Node Bridge for Roll (FIG. 2D), the one or more access nodes 105 may be embodied as any of a node hosting an IPv4 router, a node hosting an IPv6 router, a node hosting transmission functions, a node hosting Ethernet link functions, or a node hosting one or more virtual network functions ("VNFs"), and/or the like, and the one or more access nodes 105 may be arranged in any connected order in network 115 (either as shown in FIG. 2 or in a different connected order relative to other access nodes 105 and hardware nodes 110, as appropriate), and multiple similar nodes (i.e., nodes with same or similar functionalities) may be directly connected within the network connection chain linking the access nodes 105 with each other and with hardware nodes 110, via links 120 and 125.

Similarly, for each of the Link Insertion (FIG. 2A), Simple Join (FIG. 2B), Link Bridge for Roll (FIG. 2C), and Node Bridge for Roll (FIG. 2D), the VM node 135 may be embodied as any of a node hosting a VM, a firewall node, a node hosting one or more VNFs, a node configured to implement security detection, and/or the like. Likewise, for each of the Link Insertion (FIG. 2A), Simple Join (FIG. 2B), Link Bridge for Roll (FIG. 2C), and Node Bridge for Roll (FIG. 2D), the one or more hardware nodes 110 may be embodied as any of a wireless access point, a WiFi access point, one or more physical ports, one or more USB ports, or one or more codec devices, one or more other special resource devices, and/or the like.

Figure 2C:
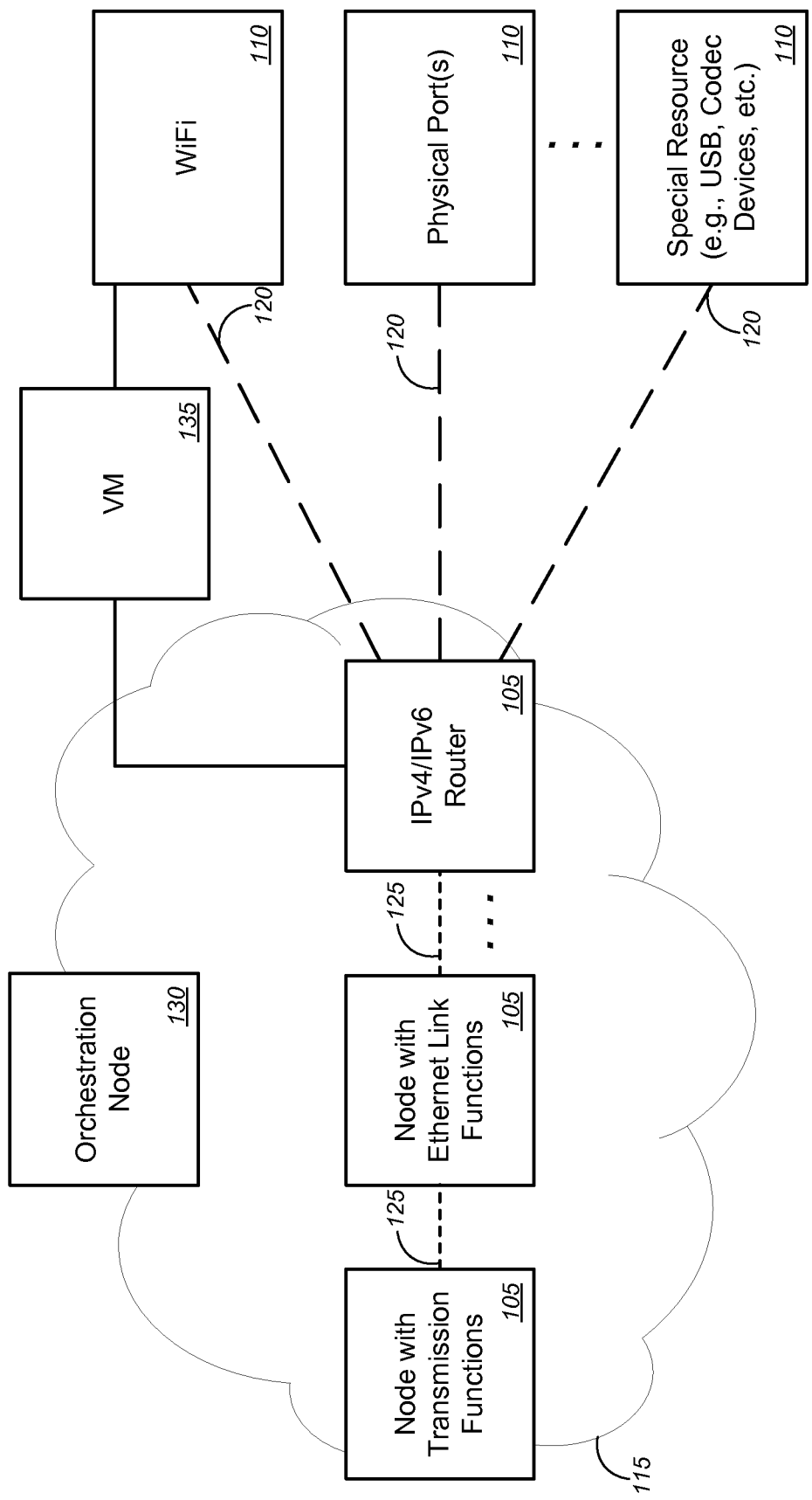

We now turn to FIG. 3, which depicts a non-limiting example of bridging, roll-over, and roll-back for a Link Bridge for Roll configuration (such as the Link Bridge for Roll configuration as shown in FIG. 2C). FIG. 3A depicts a particular configuration of an embodiment, prior to a VM node 135 (or other second access node 135) being bridged over any links 120 or 125.

Figure 3A:
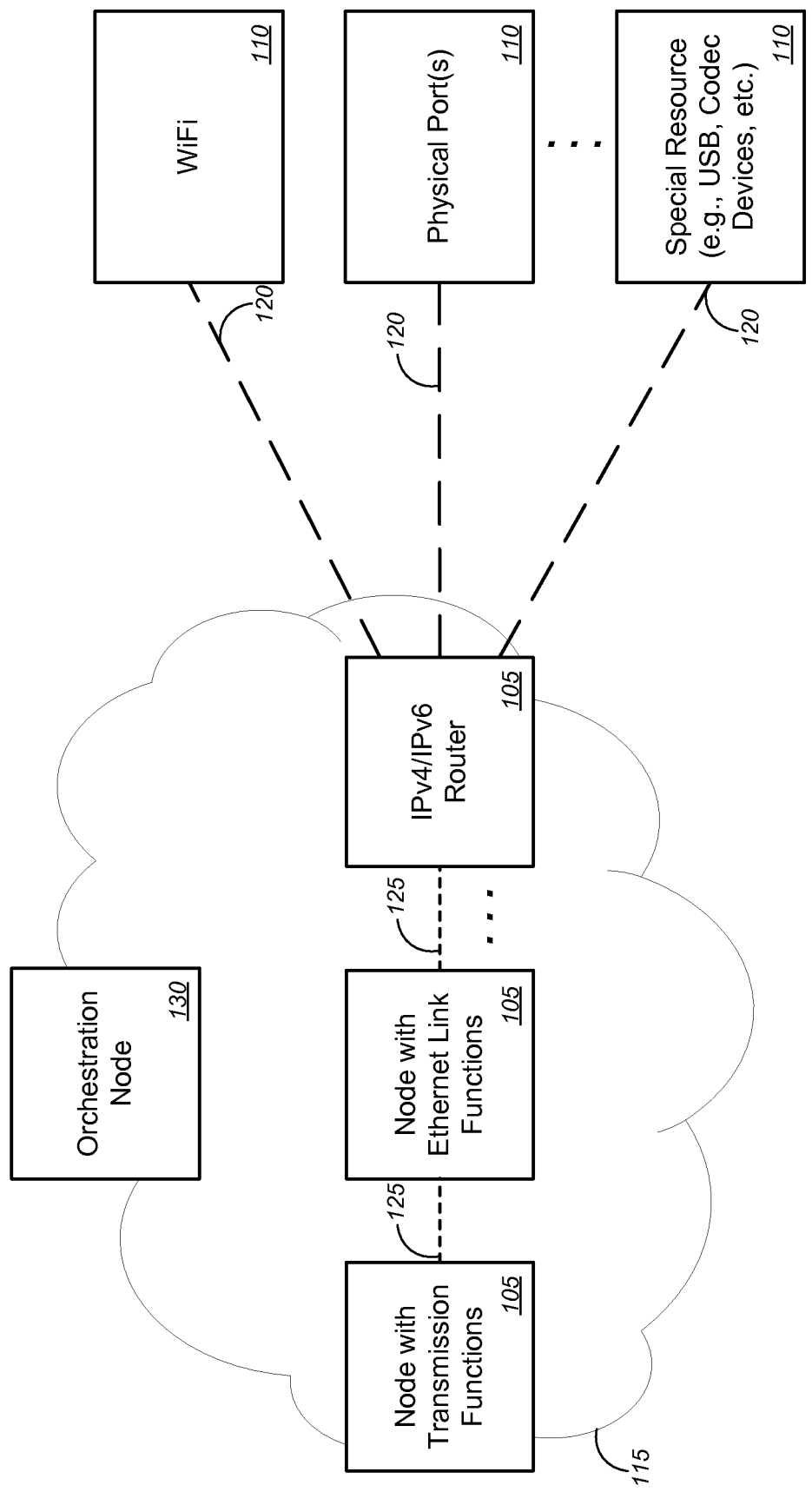
FIGS. 3A-3D are schematic diagrams illustrating system configurations for a method of implementing a bridge-and-roll access construct across a network link for network or cloud orchestration, in accordance with various embodiments.
Figure 3B:
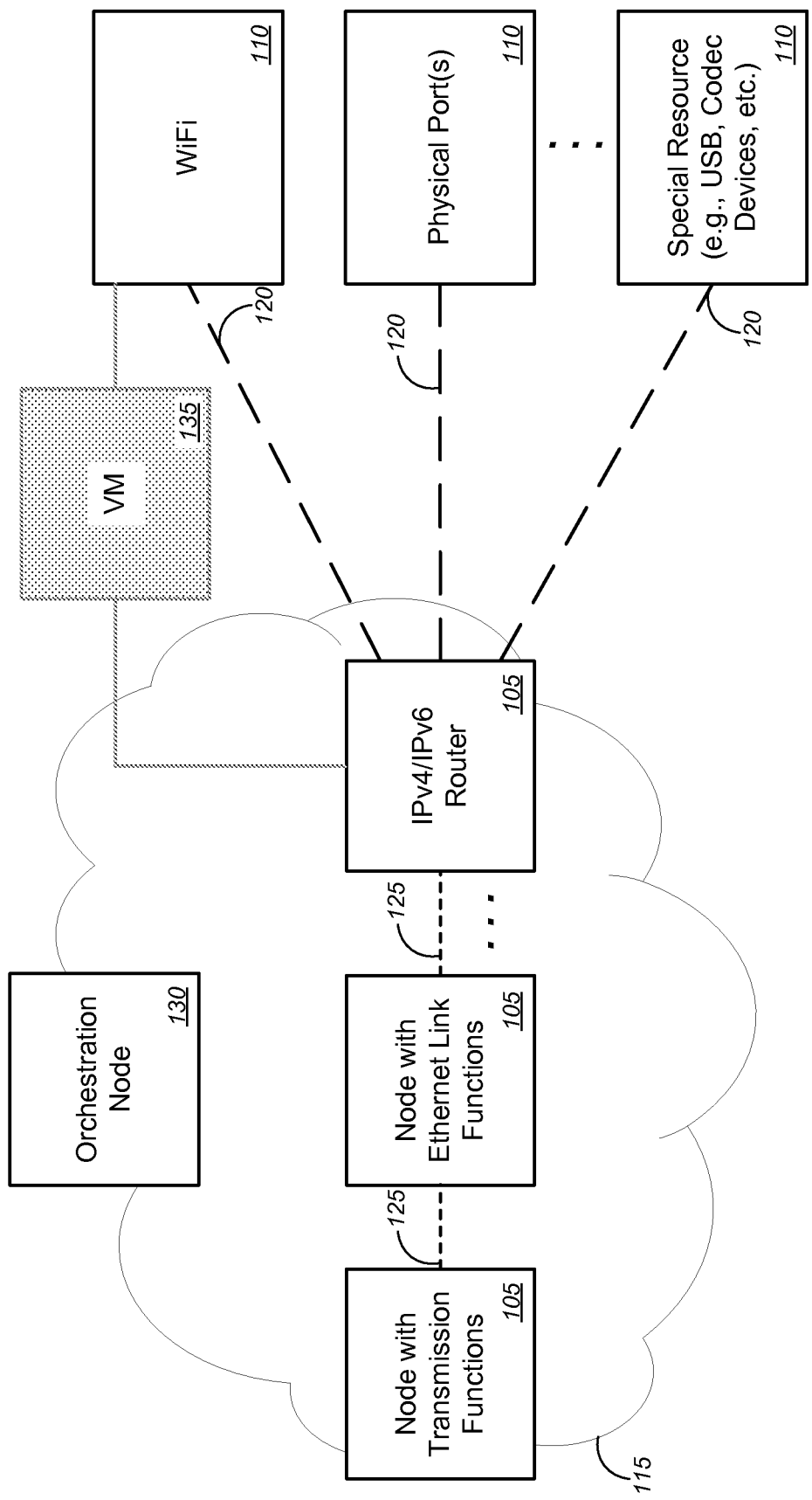

In the embodiment of FIG. 3B, a VM node 135 (or other second access node 135) is bridged over a link (e.g., link 120 connecting access node 105 having IPv4 or IPv6 router functionality with hardware node 110 having WiFi access point functionality, in the example of FIG. 3), without rolling over service from service through the bridged link to service through the VM node 135 (or the other second access node 135). In FIG. 3B, the bridging, but not yet service-rolled, VM node 135 (or other second access node 135) is depicted as a shaded block with gray link lines connected to each of the access node 105 having IPv4 or IPv6 router functionality and the hardware node 110 having WiFi access point functionality. At this stage, testing may be performed on the VM node 135 (or other second access node 135) or on service through the VM node 135 (or other second access node 135), in order to determine whether service through the VM node 135 (or other second access node 135) can be delivered within expected thresholds of operation; can be delivered within operational ranges in view of existing service over the link over which the VM node 135 (or other second access node 135) is intended to be bridged or has been bridged; can be operated as intended; and/or the like.

Figure 3C:
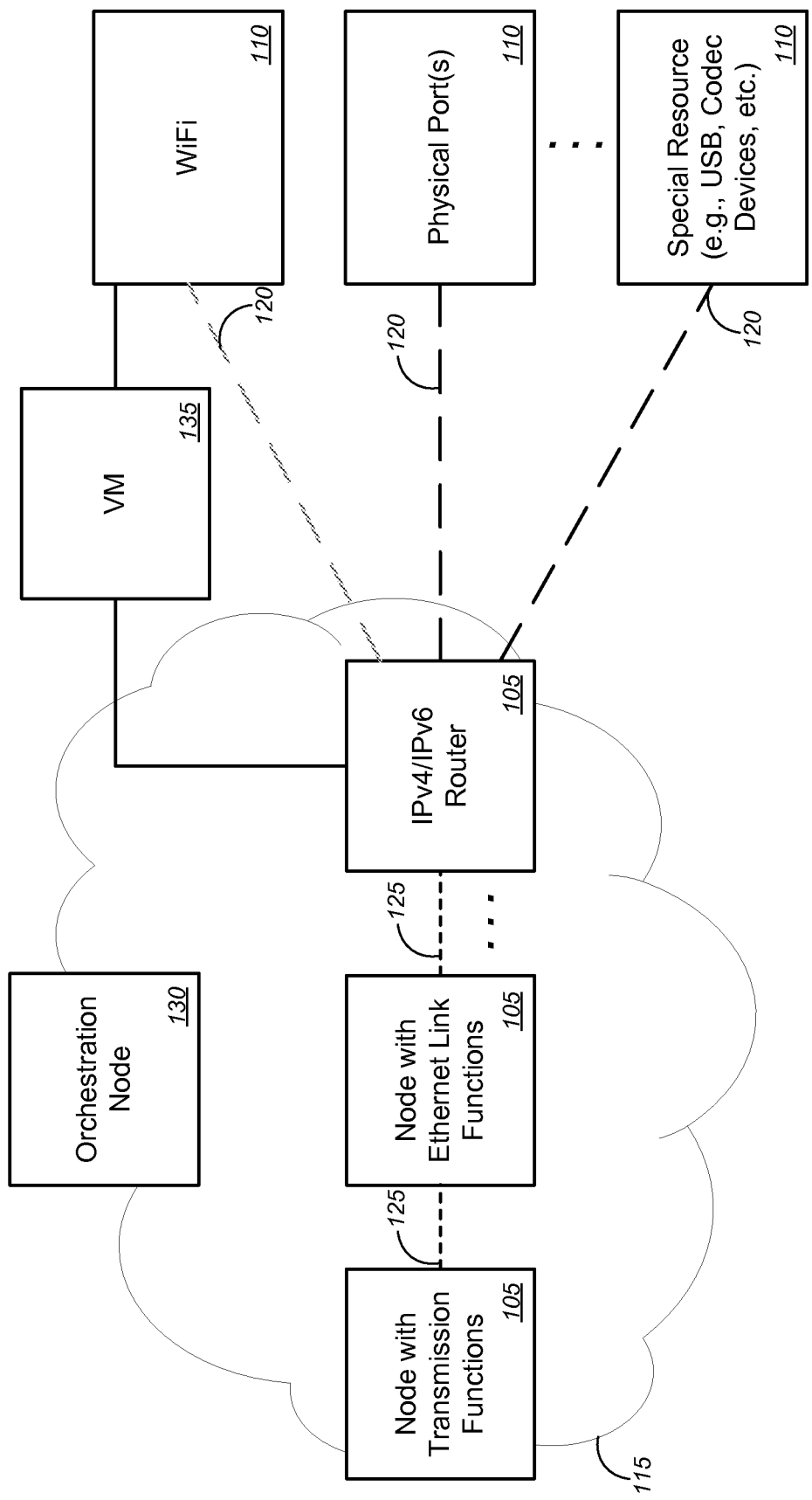

In the embodiment of FIG. 3C, service may be rolled over from the bridged link (in this particular non-limiting case, link 120 connecting access node 105 having IPv4 or IPv6 router functionality with hardware node 110 having WiFi access point functionality) to the VM node 135 (or other second access node 135). In FIG. 3C, the bridged link, after service has been rolled over to the VM node 135 (or other second access node 135), is depicted with gray link lines 120 (still) connected to each of the access node 105 having IPv4 or IPv6 router functionality and the hardware node 110 having WiFi access point functionality, while the VM node 135 (or other second access node 135) is depicted as an un-shaded block with black lines connected to each of the access node 105 having IPv4 or IPv6 router functionality and the hardware node 110 having WiFi access point functionality. Importantly, the bridged link is not immediately or soon-after torn down, after rolling service over to the VM node 135 (or other second access node 135), for at least a significant period of time (e.g., days, weeks, months, etc.), and not merely for a small amount of time after rolling over to the VM node 135 (or other second access node 135) (e.g., seconds, minutes, hours, etc.). During this significant period of time, on either a periodic, a scheduled, and/or a random basis, it may be determined whether a failure has occurred during service through the VM node 135 (or other second access node 135). According to some embodiments, a failure might include, without limitation, at least one of an error during operation of the service, reduced performance compared with performance through the bridged link, reduced performance compared with expected performance through the VM node 135 (or other second access node 135), and/or the like.

Figure 3D:
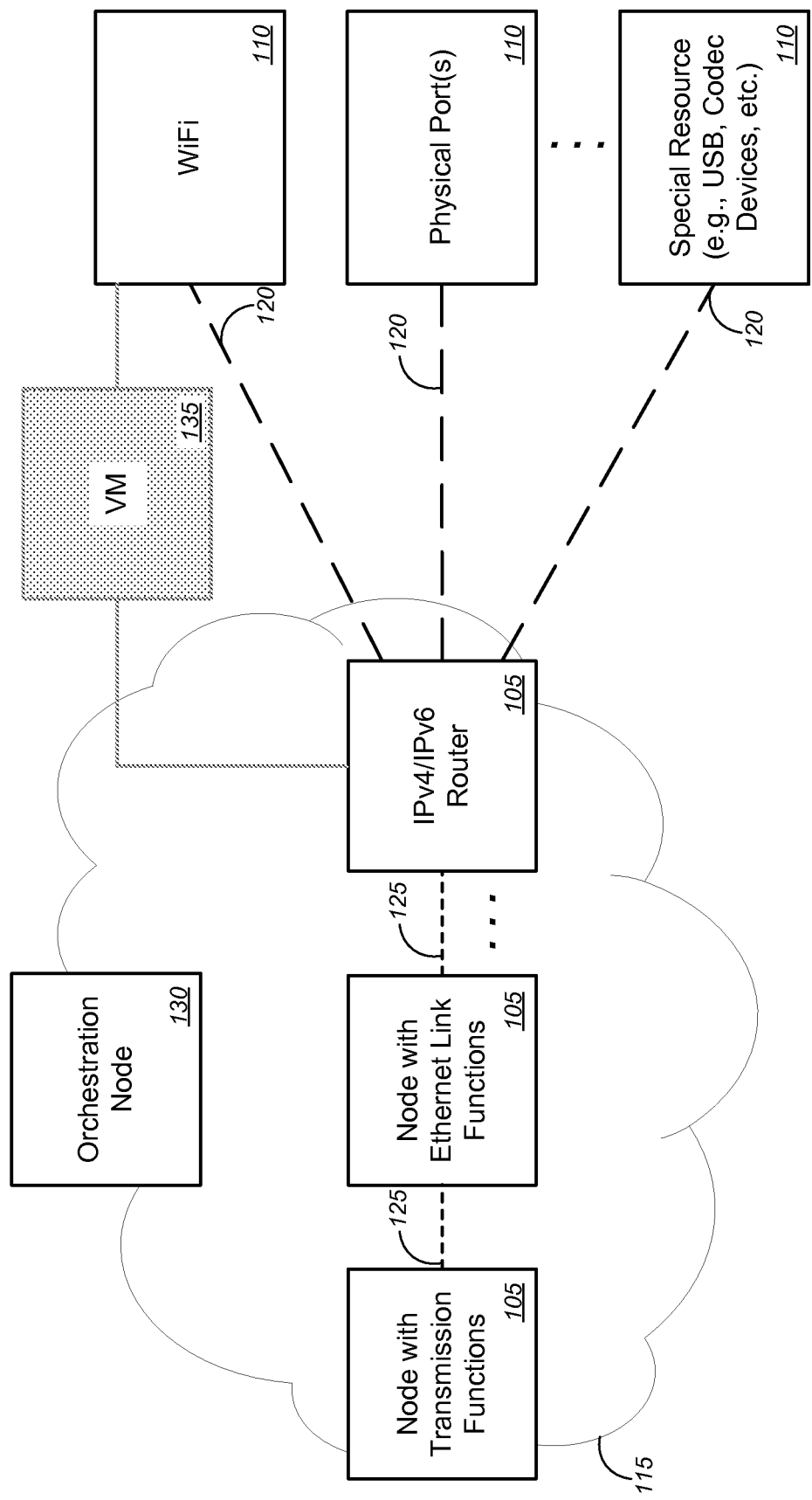

As shown in the embodiment of FIG. 3D, based at least in part on a determination that a failure has occurred during service through the VM node 135 (or other second access node 135), service may be rolled back over, from the VM node 135 (or other second access node 135), to the bridged link (in this particular non-limiting case, link 120 connecting access node 105 having IPv4 or IPv6 router functionality with hardware node 110 having WiFi access point functionality). In FIG. 3D, after rolling back service to the bridged link (i.e., link 120), the bridging VM node 135 (or other second access node 135) is once again depicted as a shaded block with gray link lines connected to each of the access node 105 having IPv4 or IPv6 router functionality and the hardware node 110 having WiFi access point functionality, while the bridged link (i.e., link 120) is again depicted as black, long dashed lines connected to each of the access node 105 having IPv4 or IPv6 router functionality and the hardware node 110 having WiFi access point functionality. In some embodiments, such roll-back might be facilitated by allowing the bridged link to remain connected (but without service operating therethrough)—i.e., by not tearing down the link after rolling service over to the VM node 135 (or other second access node 135), for at least the significant period of time indicated above.

Figure 2D:
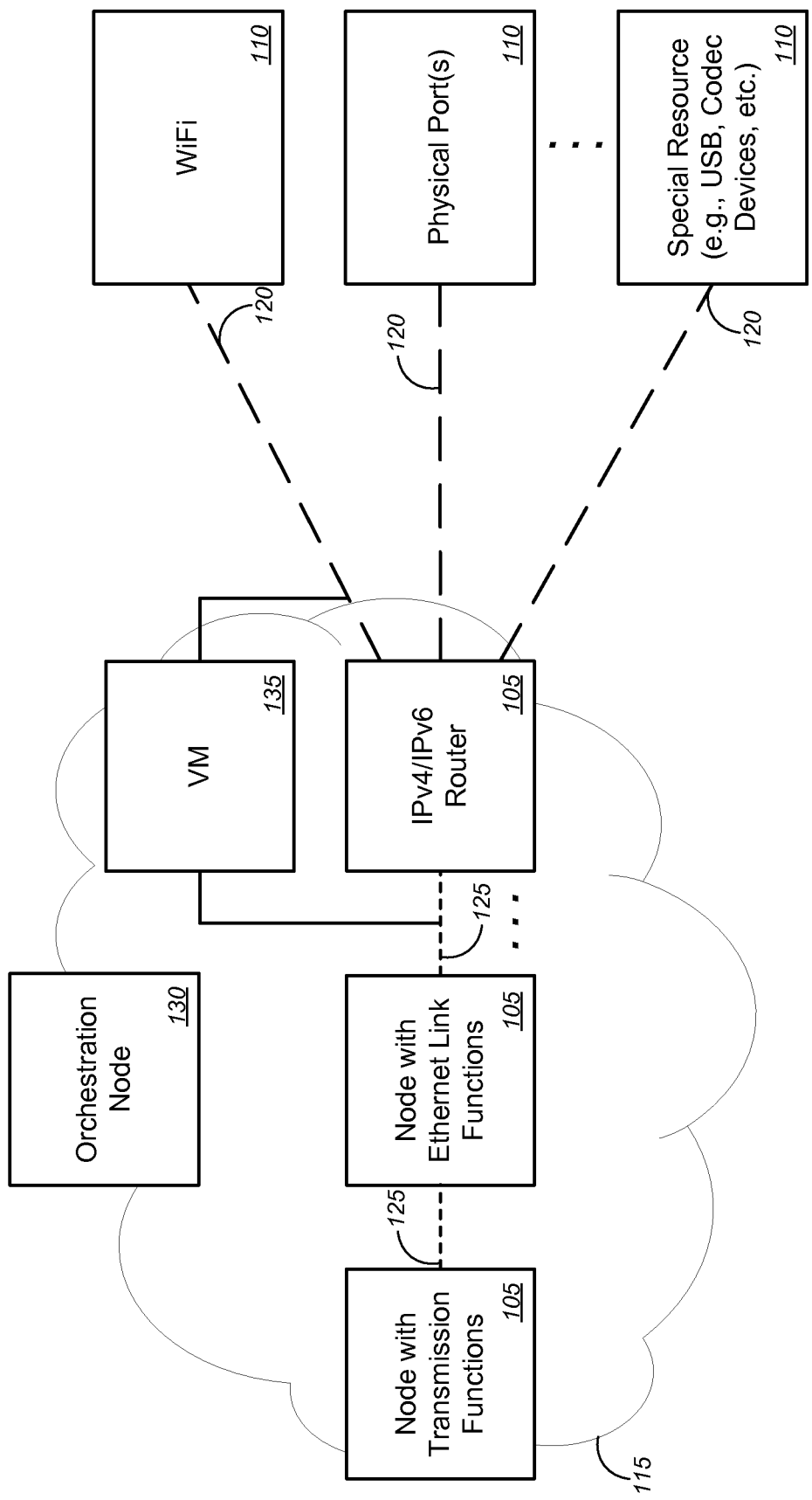

FIG. 4 is similar to FIG. 3, except that FIG. 4 depicts a non-limiting example of bridging, roll-over, and roll-back for a Node Bridge for Roll configuration (such as the Node Bridge for Roll configuration as shown in FIG. 2D). FIG. 4A, which depicts a particular configuration of an embodiment, prior to a VM node 135 (or other second access node 135) being bridged over any nodes 105 or 110, is similar, if not identical, to the embodiment of FIG. 3A, and the description of the embodiment of FIG. 3A similarly applies to the embodiment of FIG. 4A.

Figure 4A:
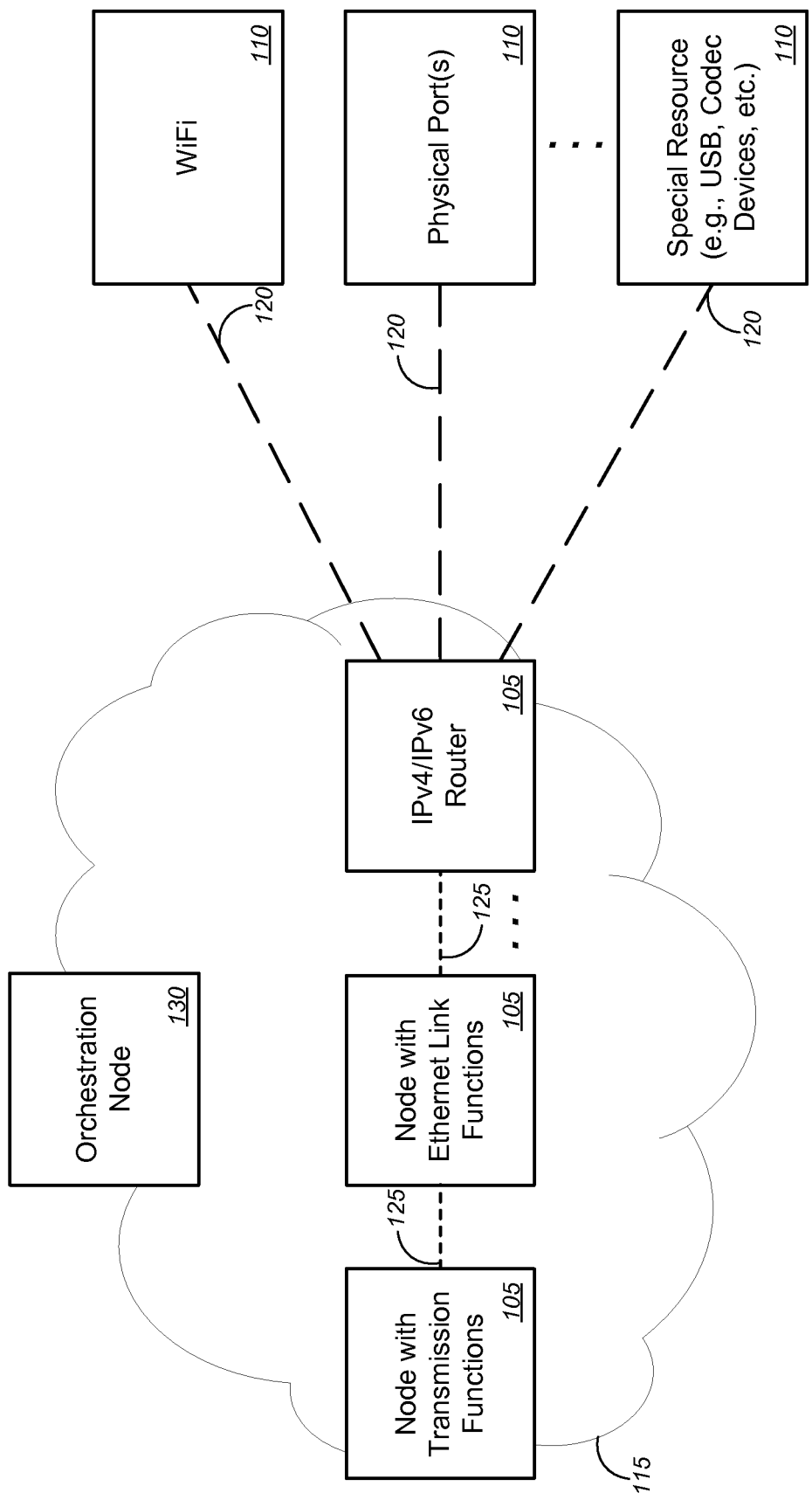
FIGS. 4A-4D are schematic diagrams illustrating system configurations for a method of implementing a bridge-and-roll access construct across a network access node for network or cloud orchestration, in accordance with various embodiments.
Figure 4B:
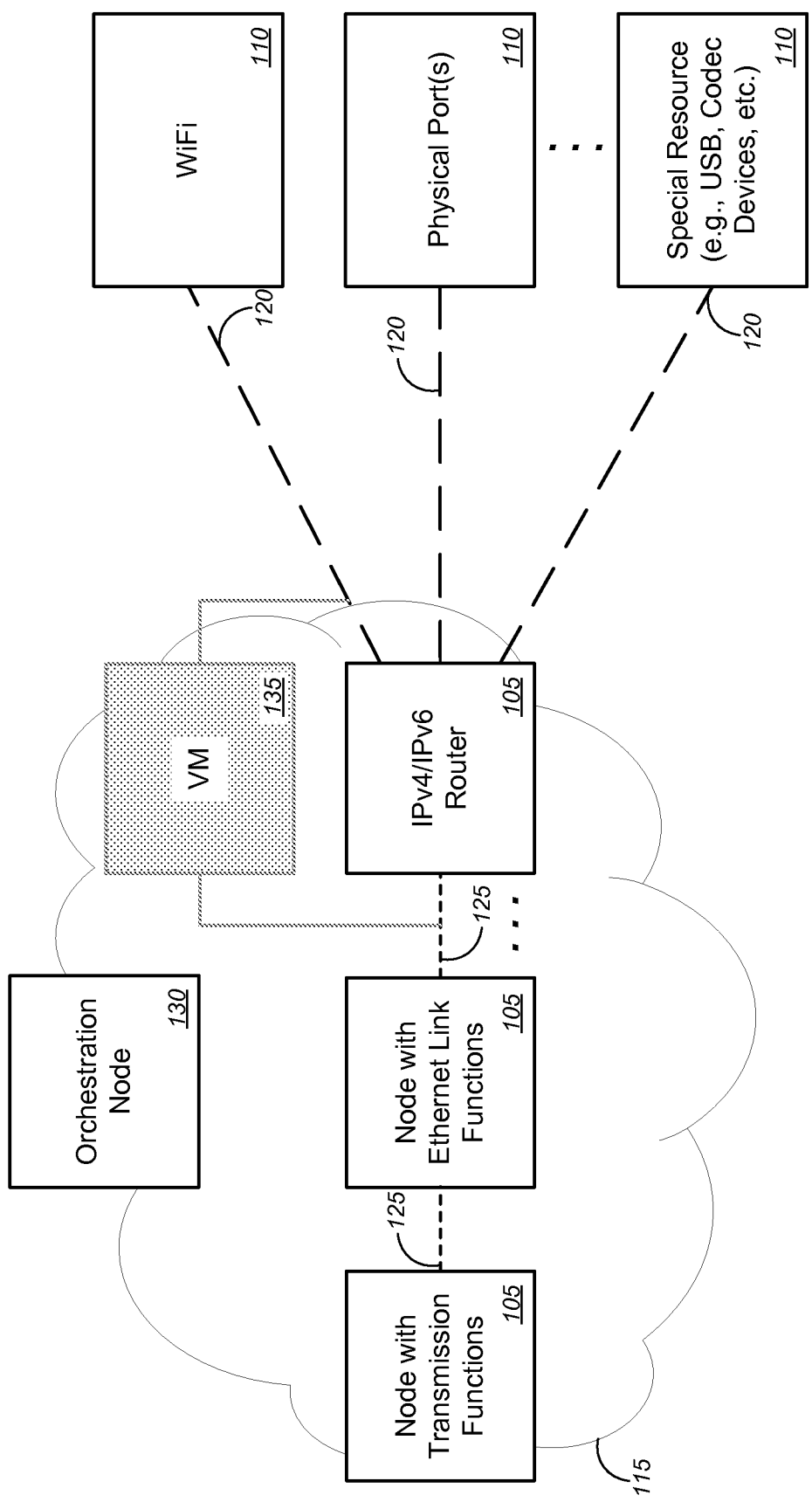

In the embodiment of FIG. 4B, a VM node 135 (or other second access node 135) is bridged over a node (e.g., an access node 105 having IPv4 or IPv6 router functionality, while being connected to link 125 connecting the access node 105 having IPv4 or IPv6 router functionality and an access node 105 having Ethernet link functionality, and connected to link 120 connecting the access node 105 having IPv4 or IPv6 router functionality with a hardware node 110 having WiFi access point functionality, in the example of FIG. 4), without rolling over service from service through the bridged node to service through the VM node 135 (or the other second access node 135). In FIG. 4B, the bridging, but not yet service-rolled, VM node 135 (or other second access node 135) is depicted as a shaded block with gray link lines connected to each of the above-mentioned links 125 and 120 on either side of the access node 105 having IPv4 or IPv6 router functionality. At this stage, testing may be performed on the VM node 135 (or other second access node 135) or on service through the VM node 135 (or other second access node 135), in order to determine whether service through the VM node 135 (or other second access node 135) can be delivered within expected thresholds of operation; can be delivered within operational ranges in view of existing service over the node over which the VM node 135 (or other second access node 135) is intended to be bridged or has been bridged; can be operated as intended, and/or the like.

Figure 4C:
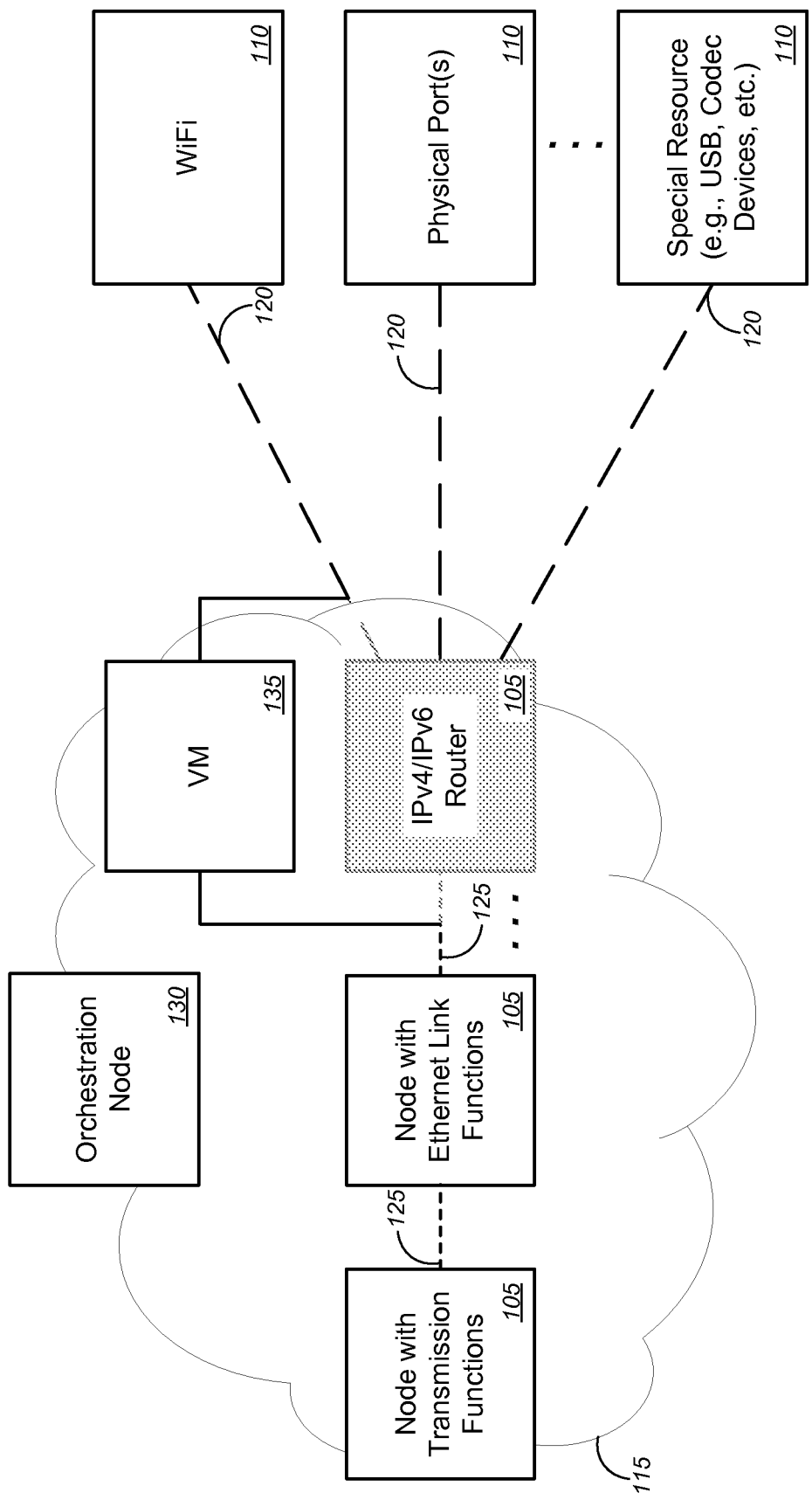

In the embodiment of FIG. 4C, service may be rolled over from the bridged node (in this particular non-limiting case, the access node 105 having IPv4 or IPv6 router functionality) to the VM node 135 (or other second access node 135). In FIG. 4C, the bridged node, after service has been rolled over to the VM node 135 (or other second access node 135), is depicted as a shaded block with gray link lines connected to each of the link 120 connected to the hardware node 110 having WiFi access point functionality and the link 125 connected to the access node 105 having Ethernet link functionality, while the VM node 135 (or other second access node 135) is depicted as an un-shaded block with black lines connected to each of the link 120 connected to the hardware node 110 having WiFi access point functionality and the link 125 connected to the access node 105 having Ethernet link functionality. Importantly, the bridged node is not immediately or soon-after torn down, after rolling service over to the VM node 135 (or other second access node 135), for at least a significant period of time (e.g., days, weeks, months, etc.), and not merely for a small amount of time after rolling over to the VM node 135 (or other second access node 135) (e.g., seconds, minutes, hours, etc.). During this significant period of time, on either a periodic, a scheduled, and/or a random basis, it may be determined whether a failure has occurred during service through the VM node 135 (or other second access node 135).

According to some embodiments, a failure might include, without limitation, at least one of an error during operation of the service, reduced performance compared with performance through the bridged node, reduced performance compared with expected performance through the VM node 135 (or other second access node 135), and/or the like.

Figure 4D:
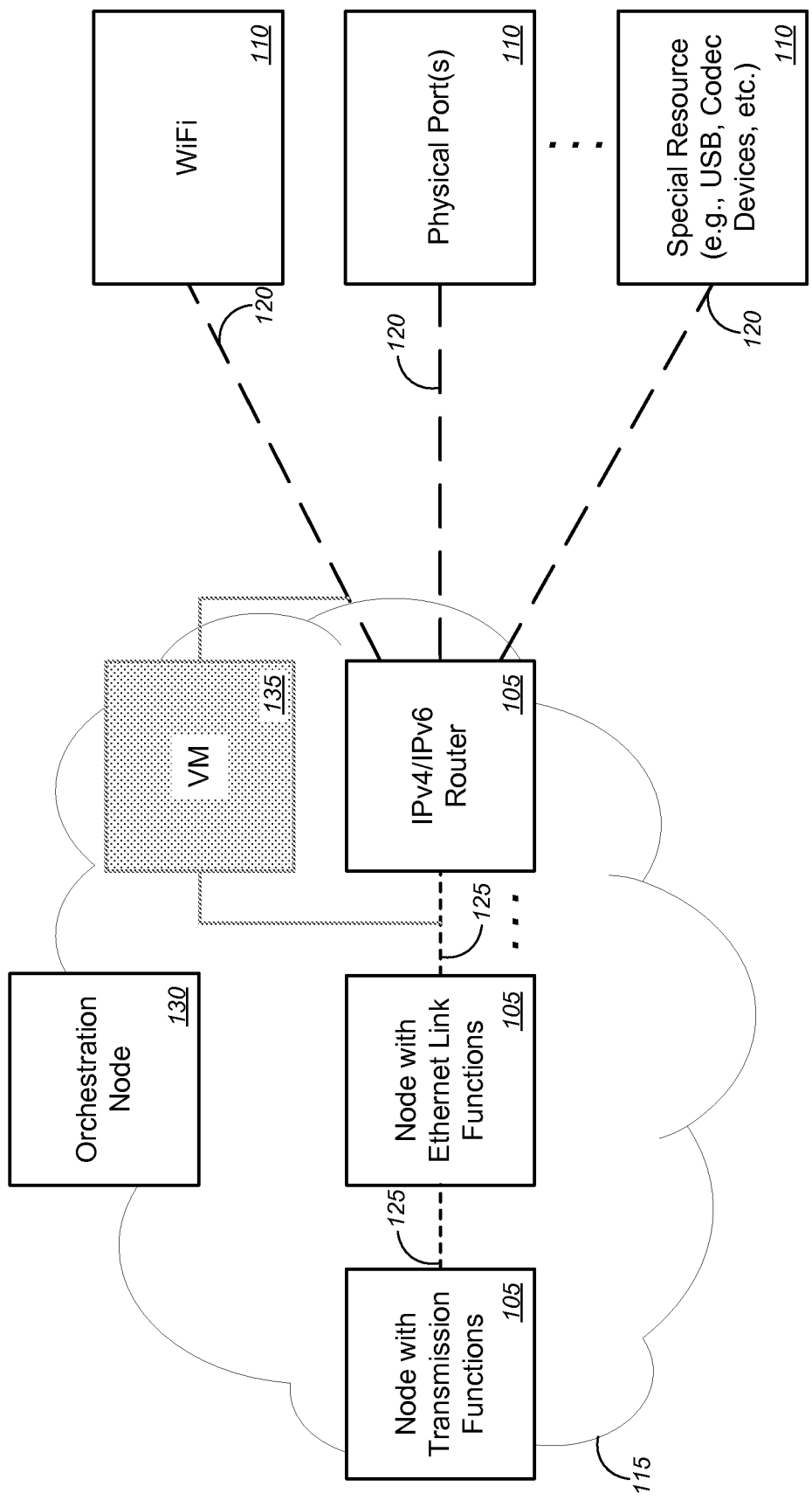

As shown in the embodiment of FIG. 4D, based at least in part on a determination that a failure has occurred during service through the VM node 135 (or other second access node 135), service may be rolled back over, from the VM node 135 (or other second access node 135), to the bridged node (in this particular non-limiting case, the access node 105 having IPv4 or IPv6 router functionality). In FIG. 4D, after rolling back service to the bridged node, the bridging VM node 135 (or other second access node 135) is once again depicted as a shaded block with gray link lines connected to each of the above-mentioned links 125 and 120 on either side of the access node 105 having IPv4 or IPv6 router functionality, while the bridged node (i.e., the access node 105 having IPv4 or IPv6 router functionality) is again depicted as an un-shaded block with black lines connected to each of the link 120 connected to the hardware node 110 having WiFi access point functionality and the link 125 connected to the access node 105 having Ethernet link functionality. In some embodiments, such roll-back might be facilitated by allowing the bridged link to remain connected (but without service operating therethrough)—i.e., by not tearing down the node after rolling service over to the VM node 135 (or other second access node 135), for at least the significant period of time indicated above.

Figure 5A:
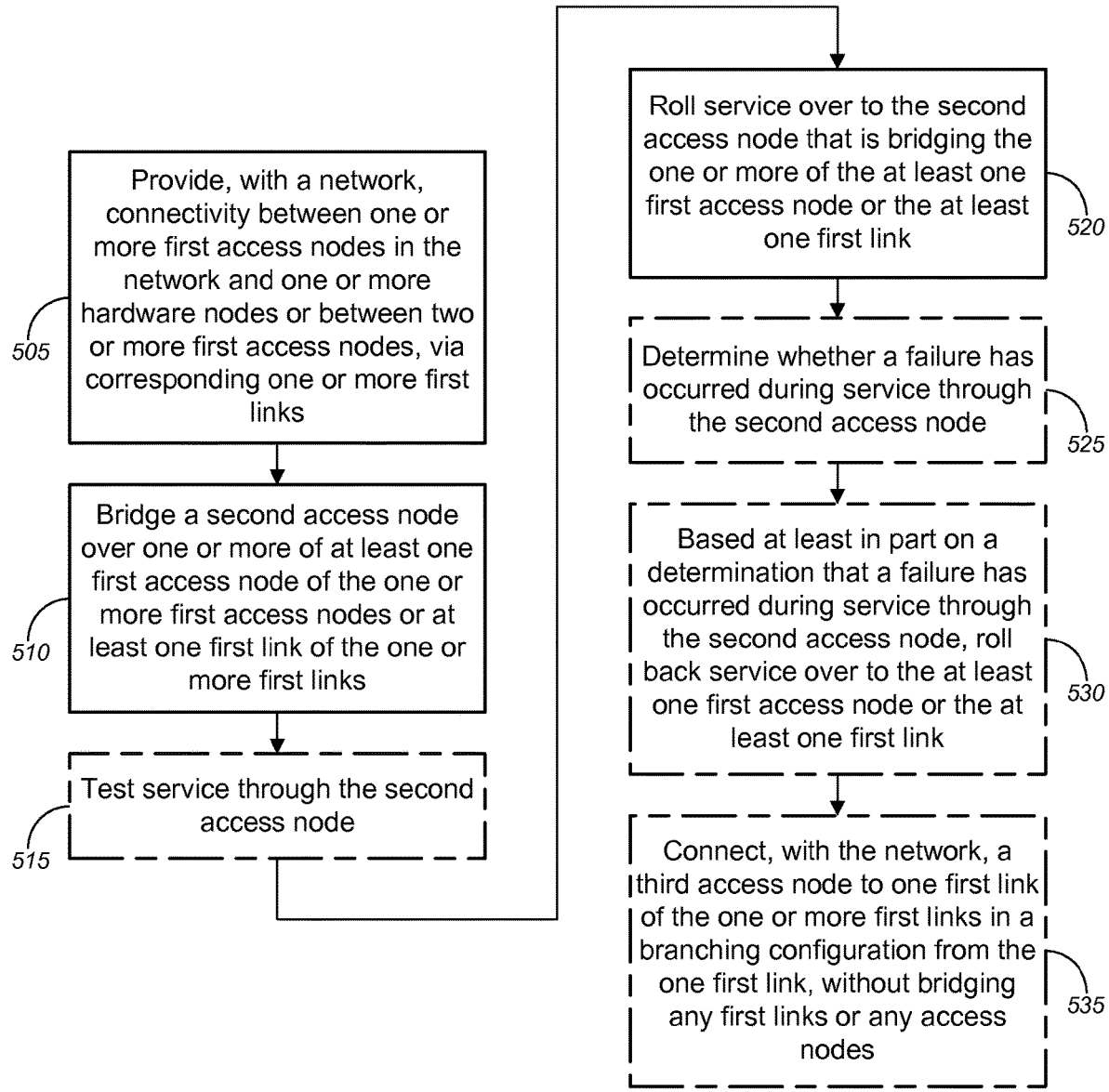
FIGS. 5A and 5B represent system flow diagrams illustrating a method for implementing access constructs in a network, in accordance with various embodiments.
Figure 5B:
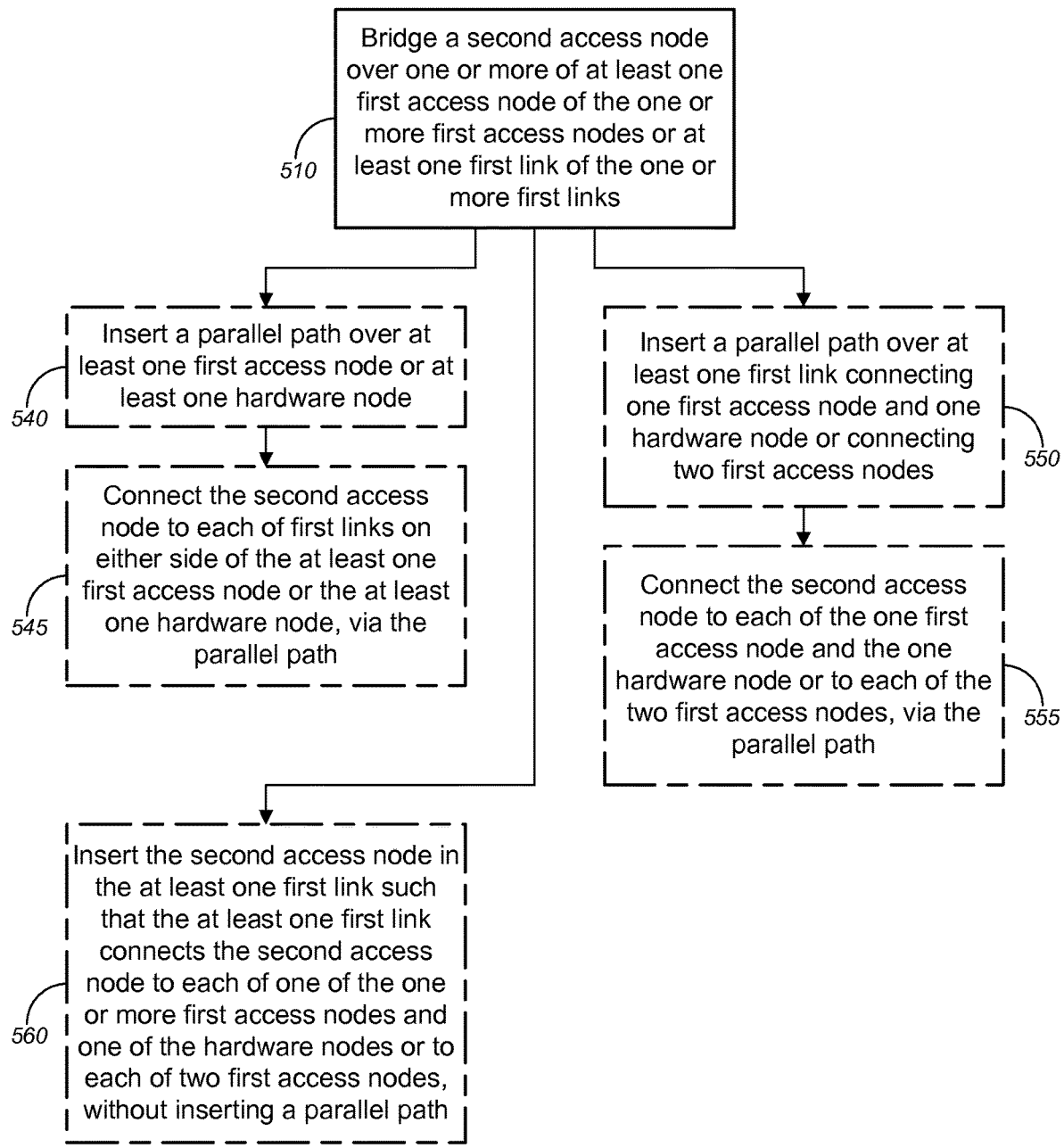

FIGS. 5A and 5B (collectively, "FIG. 5") represent a system flow diagram illustrating a method 500 for implementing access constructs in a network, in accordance with various embodiments. The embodiments as represented in FIG. 5 are merely illustrative and are not intended to limit the scope of the various embodiments. With reference to FIG. 5, method 500 in FIG. 5B illustrates alternative embodiments for bridging a second access node over one or more of at least one first access node or at least one first link in optional block 510 of FIG. 5A.

While the techniques and procedures are depicted and/or described in a certain order for purposes of illustration, it should be appreciated that certain procedures may be reordered and/or omitted within the scope of various embodiments. Moreover, while the method illustrated by FIG. 5 can be implemented by or with (and, in some cases, are described below with respect to) the systems 100 and 200 of FIGS. 1 and 2, respectively (or components thereof), in some cases using (for example, but not limited to) the system configurations 300 and 400 of FIGS. 3 and 4, respectively (or components thereof) for implementing bridge-and-roll access constructs across a network link or a network access node for network or cloud orchestration, such methods may also be implemented using any suitable hardware implementation and using other system configurations. Similarly, while each of the systems 100 and 200 of FIGS. 1 and 2, respectively (or components thereof), using (for example, but not limited to) the system configurations 300 and 400 of FIGS. 3 and 4, respectively (or components thereof) for implementing bridge-and-roll access constructs across a network link or a network access node for network or cloud orchestration, can operate according to the method illustrated by FIG. 5 (e.g., by executing instructions embodied on a computer readable medium), the systems 100 and 200, using (for example, but not limited to) the system configurations 300 and 400 of FIGS. 3 and 4, respectively (or components thereof) for implementing bridge-and-roll access constructs across a network link or a network access node for network or cloud orchestration, can each also operate according to other modes of operation and/or perform other suitable procedures.

In the embodiment of FIG. 5, method 500, at block 505, might comprise providing, with a network, connectivity between one or more first access nodes in the network and one or more hardware nodes or between two or more first access nodes, via corresponding one or more first links. In some embodiments, the network can include, but is not limited to, a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet. According to some embodiments, the network might include a software defined network ("SDN"), or the like.

In some cases, the one or more first access nodes might each include, without limitation, at least one of a node hosting an IPv4 router, a node hosting an IPv6 router, a node hosting transmission functions, a node hosting Ethernet link functions, or a node hosting one or more virtual network functions ("VNFs"), and/or the like. In some instances, the one or more hardware nodes might each include, but are not limited to, at least one of a wireless access point, a WiFi access point, one or more physical ports, one or more USB ports, or one or more codec devices, and/or the like. According to some embodiments, the second access node might include, without limitation, at least one of a node hosting a virtual machine, a firewall node, a node hosting one or more VNFs, a node configured to implement security detection, and/or the like.

At block 510, method 500 might comprise bridging a second access node over one or more of at least one first access node of the one or more first access nodes or at least one first link of the one or more first links. Various embodiments of the process of bridging the second access node over the at least one first access node and/or over the at least one first link are described in detail below with respect to FIG. 5B.

Method 500 might further comprise, at optional block 515, testing service through the second access node (which is described in detail above). Method 500, at block 520, might comprise rolling service over to the second access node that is bridging the one or more of the at least one first access node or the at least one first link. Herein, "rolling service over to the second access node" might refer to starting service through the second access node and stopping service through the one or more of the at least one first access node or the at least one first link over which the second access node is bridged.

In some embodiments, method 500 might further comprise determining whether a failure has occurred during service through the second access node (optional block 525) and, based at least in part on a determination that a failure has occurred during service through the second access node, rolling service back over to the at least one first access node or the at least one first link (optional block 530). The sequence of providing connectivity between first access nodes and hardware nodes or between two or more first access nodes, bridging and rolling service over to the second access node that is bridging the one or more of the at least one first access node or the at least one first link, determining whether a failure has occurred during service through the second access node, and rolling service back over to the at least one first access node or the at least one first link is described in detail above with respect to FIGS. 3 and 4.

At optional block 535, method 500 might comprise connecting, with the network, a third access node to one first link of the one or more first links in a branching configuration from the one first link, without bridging any of the one or more first links or any of the one or more first access nodes (as shown, e.g., in the embodiment of FIG. 2B).

With reference to FIG. 5B, the process of bridging the second access node over the at least one first access node and/or over the at least one first link (at block 510) might comprise one of the following: (a) inserting a parallel path over at least one first access node or at least one hardware node (optional block 540) and connecting the second access node to each of first links on either side of the at least one first access node or the at least one hardware node, via the parallel path (optional block 545); (b) inserting a parallel path over at least one first link connecting one first access node and one hardware node or connecting two first access nodes (optional block 550) and connecting the second access node to each of the one first access node and the one hardware node or to each of the two first access nodes, via the parallel path (optional block 555); (c) inserting the second access node in the at least one first link such that the at least one first link connects the second access node to each of one of the one or more first access nodes and one of the hardware nodes or to each of two first access nodes, without inserting a parallel path (optional block 560); and/or the like.

Exemplary System and Hardware Implementation

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of the first access node(s) 105, the second access node(s) 135, the third access node(s) 140, the orchestration node(s) 130, the hardware node(s) 110, user devices or computing systems in communication with any of these devices, virtual machines and/or virtualized network functions ("VNFs") running on any of these devices, and/or the like, as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the first access node(s) 105, the second access node(s) 135, the third access node(s) 140, the orchestration node(s) 130, the hardware node(s) 110, user devices or computing systems in communication with any of these devices, virtual machines and/or virtualized network functions ("VNFs") running on any of these devices, and/or the like, as described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as digital signal processing chips, graphics acceleration processors, and/or the like); one or more input devices 615, which can include, without limitation, a mouse, a keyboard and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

As noted above, a set of embodiments comprises methods and systems for implementing access constructs in a network, and, in some cases, for implementing access constructs for cloud orchestration. FIG. 7 illustrates a schematic diagram of a system 700 that can be used in accordance with one set of embodiments. The system 700 can include one or more user computers or user devices 705. A user computer or user device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device 705 can also have any of a variety of applications, including one or more applications configured to perform methods provided by various embodiments (as described above, for example), as well as one or more office applications, database client and/or server applications, and/or web browser applications. Alternatively, a user computer or user device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers or user devices 705, any number of user computers or user devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 705 and/or another server 715. In some embodiments, an application server can perform one or more of the processes for implementing access constructs in a network, and, in some cases, for implementing access constructs for cloud orchestration, or the like, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer or user device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary: merely by way of example, a database 720a might reside on a storage medium local to (and/or resident in) a server 715a (and/or a user computer or user device 705). Alternatively, a database 720b can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle database, that is adapted to store, update, and retrieve data in response to SQL-formatted commands. The database might be controlled and/or maintained by a database server, as described above, for example.

According to some embodiments, system 700 might further comprise one or more nodes 725 (including, but not limited to, first access nodes, second access nodes, hardware nodes, and/or the like) and/or one or more orchestration nodes 730 (e.g., orchestration node 130, or the like), as described in detail above with respect to FIGS. 1-5. In some embodiments, one or more of the user device 705a, the user device 705b, the server 715a, the server 715b, the database 720a, and/or the database 720b might be in the same network 710 as one of the one or more nodes 725 or the one or more orchestration nodes 730. In alternative or additional embodiments, one or more of the user device 705a, the user device 705b, the server 715a, the server 715b, the database 720a, and/or the database 720b might be in a first network 710 that is different from another network(s) 710 in which each of the one or more nodes 725 or the one or more orchestration nodes 730 are located.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
providing, with a network, connectivity between one or more first access nodes in the network and one or more hardware nodes, wherein the one or more hardware nodes are separate from an orchestration node, or between two or more first access nodes, wherein the two or more access nodes are separate from the orchestration node, via corresponding one or more first links;
bridging, with the orchestration node in the network, a second access node over at least one first link of the one or more first links between a first access node of the one or more first access nodes and a hardware node of the one or more hardware nodes or between two first access nodes of the one or more first access nodes by connecting the second access node to the at least one first link;
rolling, with the orchestration node, service over to the second access node that is bridging the at least one first link; and
bridging a third access node over one or more of the at least one first access node by inserting a parallel path over the at least one first access node, connecting the third access node to a second link located on a first side of the at least one first access node via the parallel path, and connecting the third access node to a third link located on a second side of the at least one first access node via the parallel path; and
rolling service over to the third access node that is bridging the at least one first access node.

2. The method of claim 1, wherein the one or more first access nodes each comprises at least one of a node hosting an IPv4 router, a node hosting an IPv6 router, a node hosting transmission functions, a node hosting Ethernet link functions, or a node hosting one or more virtual network functions ("VNFs").

3. The method of claim 1, wherein the one or more hardware nodes each comprises at least one of a wireless access point, a WiFi access point, one or more physical ports, one or more USB ports, or one or more codec devices.

4. The method of claim 1, wherein the second access node comprises at least one of a node hosting a virtual machine, a firewall node, a node hosting one or more VNFs, or a node configured to implement security detection.

5. The method of claim 1, wherein rolling service over to the third access node comprises starting service through the third access node and stopping service through the at least one first access node.

6. The method of claim 5, further comprising:
determining whether a failure has occurred during service through the third access node, the failure comprising at least one of an error during operation of the service, reduced performance compared with performance through the at least one first access node, or reduced performance compared with expected performance through the third access node;
based at least in part on a determination that a failure has occurred during service through the third access node, rolling back service over to the at least one first access node, by restarting service through the at least one first access node and stopping service through the third access node.

7. The method of claim 1, wherein bridging the second access node over the at least one first link comprises inserting the second access node in the at least one first link such that the at least one first link connects the second access node to each of one of the one or more first access nodes and one of the hardware nodes.

8. The method of claim 1, wherein bridging the second access node over the at least one first link comprises inserting a parallel path over the at least one first link connecting one first access node and one hardware node, and connecting the second access node to each of the one first access node and the one hardware node via the parallel path.

9. The method of claim 8, wherein rolling service over to the second access node comprises starting service through the second access node and stopping service through the at least one first link.

10. The method of claim 9, further comprising:
determining whether a failure has occurred during service through the second access node, the failure comprising at least one of an error during operation of the service or reduced performance compared with expected performance through the second access node;
based at least in part on a determination that a failure has occurred during service through the second access node, rolling back service over to the at least one first link, by restarting service through the at least one first link and stopping service through the second access node.

11. The method of claim 1, further comprising:
testing service through the second access node, prior to rolling service over to the second access node.

12. The method of claim 1, further comprising:
connecting, with the network, a fourth access node to one first link of the one or more first links in a branching configuration from the one first link, without bridging any of the one or more first links or any of the one or more first access nodes.

13. A system, comprising:
a network that provides connectivity between one or more first access nodes in the network and one or more hardware nodes, wherein the one or more hardware nodes are separate from an orchestration node, or between two or more first access nodes, wherein the two or more first access nodes are separate from the orchestration node, via corresponding one or more first links;

the orchestration node in the network, the orchestration node comprising:

one or more processors;

a computer readable medium in communication with the one or more processors, the computer readable medium having encoded thereon computer software comprising a set of instructions that, when executed by the one or more processors, causes the orchestration node to perform one or more operations, the set of instructions comprising:

instructions for bridging a second access node over at least one first link of the one or more first links between a first access node of the one or more first access nodes and a hardware node of the one or more hardware nodes or between two first access nodes of the one or more first access nodes by connecting the second access node to the at least one first link;

instructions for rolling service over to the second access node that is bridging the at least one first;

instructions for bridging a third access node over one or more of the at least one first access node by inserting a parallel path over the at least one first access node, connecting the third access node to a second link located on a first side of the at least one first access node via the parallel path, and connecting the third access node to a third link located on a second side of the at least one first access node via the parallel path; and instructions for rolling service over to the third access node that is bridging the at least one first access node.

14. The system of claim 13, wherein rolling service over to the third access node comprises starting service through the third access node and stopping service through the at least one first access node.

15. The system of claim 14, wherein the set of instructions further comprises:

instructions for determining whether a failure has occurred during service through the third access node, the failure comprising at least one of an error during operation of the service, reduced performance compared with performance through the at least one first access node, or reduced performance compared with expected performance through the third access node;

instructions for, based on a determination that a failure has occurred during service through the third access node, rolling back service over to the at least one first access node, by restarting service through the at least one first access node and stopping service through the third access node.

16. The system of claim 13, wherein the instructions for bridging the second access node over the at least one first link comprise instructions for inserting the second access node in the at least one first link such that the at least one first link connects the second access node to each of one of the one or more first access nodes and one of the hardware nodes.

17. The system of claim 13, wherein the instructions for bridging the second access node over the at least one first link comprise instructions for inserting a parallel path over the at least one first link connecting one first access node and one hardware node, and connecting the second access node to the one first access node and the one hardware node via the parallel path.

18. The system of claim 17, wherein the instructions for rolling service over to the second access node comprise instructions for starting service through the second access node and instructions for stopping service through the at least one first link.

19. The system of claim 18, wherein the set of instructions further comprises:

instructions for determining whether a failure has occurred during service through the second access node, the failure comprising at least one of an error during operation of the service or reduced performance compared with expected performance through the second access node;

instructions for, based on a determination that a failure has occurred during service through the second access node, rolling back service over to the at least one first link, by restarting service through the at least one first link and stopping service through the second access node.

20. An apparatus at an orchestration node in a network that provides connectivity between one or more first access nodes in the network and one or more hardware nodes, wherein the one or more hardware nodes are separate from the orchestration node, or between two or more first access nodes, wherein the two or more first access nodes are separate from the orchestration node, via corresponding one or more first links, the apparatus comprising:

a non-transitory computer readable medium having encoded thereon a set of instructions executable by one or more computers to cause the apparatus to perform one or more operations, the set of instructions comprising:

instructions for bridging a second access node over at least one first link of the one or more first links between a first access node of the one or more first access nodes and a hardware node of the one or more hardware nodes or between two first access nodes of the one or more first access nodes by connecting the second access node to the at least one first link;

instructions for rolling service over to the second access node that is bridging the at least one first link; and instructions for bridging a third access node over one or more of the at least one first access node by inserting a parallel path over the at least one first access node, connecting the third access node to a second link located on a first side of the at least one first access node via the parallel path, and connecting the third access node to a third link located on a second side of the at least one first access node via the parallel path; and instructions for rolling service over to the third access node that is bridging the at least one first access node.

* * * * *